US012651544B2

(12) United States Patent
Kim et al.

(10) Patent No.:  US 12,651,544 B2
(45) Date of Patent:      Jun. 9, 2026

(54) ELECTRONIC DEVICE COMPRISING FLEXIBLE DISPLAY AND CONTROL METHOD THEREFOR

(71) Applicant: Samsung Electronics Co., Ltd., Suwon-si (KR)

(72) Inventors: Sangheon Kim, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/898,168

(22) Filed: Sep. 26, 2024

(65) Prior Publication Data

US 2025/0022396 A1      Jan. 16, 2025

Related U.S. Application Data

(63) Continuation of application No. PCT/KR2023/001989, filed on Feb. 10, 2023.

(30) Foreign Application Priority Data

Mar. 28, 2022      (KR) ........................ 10-2022-0037846
Sep. 27, 2022      (KR) ........................ 10-2022-0122508

(51) Int. Cl.
*G09G 3/00*            (2006.01)
*G06F 1/16*            (2006.01)
(52) U.S. Cl.
CPC .......... *G09G 3/035* (2020.08); *G06F 1/1652* (2013.01); *G09G 2340/0464* (2013.01); *G09G 2340/12* (2013.01); *G09G 2354/00* (2013.01)
(58) Field of Classification Search
CPC .......... G09G 3/035; G09G 2340/0464; G09G 2340/12; G09G 2354/00; G06F 1/1652;
(Continued)

(56) References Cited

U.S. PATENT DOCUMENTS 5,564,004 A * 10/1996 Grossman ........... G06F 3/04895
715/977
10,379,720 B2      8/2019 Ryu et al.
(Continued)

FOREIGN PATENT DOCUMENTS

KR      20100009008 A      1/2010
KR      20150053650 A      5/2015
(Continued)

OTHER PUBLICATIONS

Be sure to use the new taskbar (How to use the Edge panel, Online: https://youtu.be/xZNNdH1GIU4?si=NYiXrnKno4Ov1Rid, 1 page, Aug. 20, 2021, Galaxy Z Fold 3.
(Continued)

*Primary Examiner* — Temesghen Ghebretinsae
*Assistant Examiner* — K. Kiyabu
(74) *Attorney, Agent, or Firm* — Nixon & Vanderhye P.C.

(57)            ABSTRACT

An electronic device is disclosed. The electronic device comprises: a first housing; a second housing disposed so as to be movable with respect to the first housing and overlapping at least a portion of the first housing; a flexible display at least partially mounted on the surface of the second housing, at least partially visible to the outside of the electronic device, and at least a portion of which is configured to be slid out from the inside of the first housing based on the second housing moving in a first direction with respect to the first housing, or inserted into the first housing based on the second housing moving in a second direction with respect to the first housing; a driving module comprising a gear disposed inside the first housing or the second housing and configured to move the second housing in the first direction or the second direction based on the operation of a driving source; at least one processor comprising processing circuitry; and at least one memory operably
(Continued)

connected to at least one processor, wherein at least one processor, individually and/or collectively, may be configured to receive an input for moving the second housing, and, in response to the second housing moving in the first direction based on the input, or the size of an visible area of the flexible display, based on the moving of the second housing, being a specified value or greater, control the display to display, on a partial area of the visible area, one or more icons corresponding to respective one or more applications which are being executed.

20 Claims, 19 Drawing Sheets

(58) Field of Classification Search
    CPC .......... G06F 1/16; G06F 1/1624; G06F 3/041;
                    G06F 3/04817; G06F 3/0484; H04M
                    1/02; H04M 1/72403; H04M 1/72454;
                                        H04M 1/72469
    See application file for complete search history.

(56) References Cited

U.S. PATENT DOCUMENTS

| | | | |
|---|---|---|---|
| 10,936,100 | B2 | 3/2021 | Park et al. |
| 11,252,826 | B2 | 2/2022 | Park et al. |
| 11,449,216 | B2 | 9/2022 | Rho et al. |
| 11,460,882 | B2 | 10/2022 | Ro et al. |
| 11,586,249 | B2 | 2/2023 | Sim et al. |
| 2013/0234951 | A1 | 9/2013 | Kim et al. |
| 2016/0026381 | A1* | 1/2016 | Kim .................... G06F 3/04817 |
| | | | 715/761 |
| 2017/0154609 | A1* | 6/2017 | Yoon ...................... G09G 5/373 |
| 2019/0261519 | A1* | 8/2019 | Park ...................... G06F 1/1652 |
| 2020/0201501 | A1* | 6/2020 | Rho ......................... G06F 3/016 |
| 2022/0291811 | A1* | 9/2022 | Zhang ................... G06F 1/1641 |
| 2023/0017891 | A1* | 1/2023 | Kim ................... G06F 3/04842 |
| 2023/0114950 | A1* | 4/2023 | Jung ....................... G06T 13/00 |
| | | | 345/660 |
| 2023/0152957 | A1 | 5/2023 | Yoon et al. |
| 2023/0308743 | A1 | 9/2023 | Ku et al. |
| 2024/0028180 | A1* | 1/2024 | Li .......................... G06F 1/1652 |
| 2025/0239195 | A1* | 7/2025 | Seo ........................ G06F 3/0488 |

FOREIGN PATENT DOCUMENTS

| | | | | | |
|---|---|---|---|---|---|
| KR | 20170059815 | A | 5/2017 | | |
| KR | 20170060519 | A | 6/2017 | | |
| KR | 20180020737 | A | 2/2018 | | |
| KR | 20190090982 | A | 8/2019 | | |
| KR | 20190101184 | A | 8/2019 | | |
| KR | 20190141518 | A | 12/2019 | | |
| KR | 20200076351 | A | 6/2020 | | |
| KR | 102266152 | B1 | 6/2021 | | |
| KR | 20220010978 | A | 1/2022 | | |
| KR | 20230140330 | A | * 10/2023 | ........ | H04M 1/72403 |
| WO | 2022034942 | A1 | 2/2022 | | |
| WO | WO-2024035069 | A1 | * 2/2024 | ........ | G06F 3/04817 |

OTHER PUBLICATIONS

How to pin favorite apps to the taskbar on the right side of the inner screen, Galaxy Z Fold 3, 8 pages, Sep. 8, 2021.
International Search Report for PCT/KR2023/001989 mailed May 23, 2023, 4 pages.
Written Opinion of the ISA for PCT/KR2023/001989 mailed May 23, 2023, 3 pages.

* cited by examiner

ELECTRONIC DEVICE COMPRISING FLEXIBLE DISPLAY AND CONTROL METHOD THEREFOR

CROSS-REFERENCE TO RELATED APPLICATIONS

This application is a continuation of International Application No. PCT/KR2023/001989 designating the United States, filed on Feb. 10, 2023, in the Korean Intellectual Property Receiving Office and claiming priority to Korean Patent Application Nos. 10-2022-0037846, filed on Mar. 28, 2022, and 10-2022-0122508, filed on Sep. 27, 2022, in the Korean Intellectual Property Office, the disclosures of each of which are incorporated by reference herein in their entireties.

BACKGROUND

Field

The disclosure relates to an electronic device including a flexible display and a method for controlling the same.

Description of Related Art

Along with the increasing demand for mobile communications on one hand and the increased integration level of electronic devices on the other hand, the portability of electronic devices, such as mobile communication terminals, and the convenience of using multimedia functions may be improved. For example, as displays with touch screen functions integrated therein replace traditional mechanical (button) keypads, electronic devices may be miniaturized while maintaining the functionality of an input device. For example, removal of the mechanical keypads from the electronic devices may improve their portability. When a display is extended by as much as an area where a mechanical keypad is removed, an electronic device with the touch screen functionality may provide a larger screen than an electronic device with a mechanical keypad, even if the former has the same size and weight as the latter.

In surfing the web or using multimedia functions, it may be more convenient to use an electronic device with a larger screen. Although the electronic device may be equipped with a larger display to provide a larger screen, the portability of the electronic device may limit scale-up of the display. In an embodiment, an organic light emitting diode (OLED) display may provide a larger screen, while ensuring the portability of the electronic device. For example, the OLD display (or the electronic device equipped with the OLED display) may perform a stable operation even if it is made fairly thin. Therefore, the OLED display may be mounted in a foldable or bendable form or a rollable form on the electronic device.

When multiple applications are executed, a task bar (or status bar) is displayed in a partial area of a display to improve the usability of an electronic device. The task bar includes buttons corresponding to applications running on the electronic device, and when one of the buttons is selected, the electronic device may quickly switch applications by displaying an execution screen of an application corresponding to the selected button.

In a large-screen device such as a foldable device or a tablet device, a task bar may always be exposed to enhance productivity experience. However, a task bar function is not provided in a device with a small screen size such as a smartphone.

Moreover, even when the task bar function is provided, the task bar may be pinned on a screen or hidden. However, when the task bar is pinned, it occupies an area of the display, obscuring a portion of the entire display screen, and when the task bar is automatically hidden, an action such as a touch or gesture should be performed to display the task bar on the screen.

SUMMARY

Embodiments of the disclosure may provide an electronic device which provides a task bar for facilitating switching between applications, while efficiently operating a display area, and a method for controlling the same.

According to an example embodiment, an electronic device includes: a first housing, a second housing disposed to be movable relative to the first housing and overlapping at least a portion of the first housing, a flexible display at least partially mounted on a surface of the second housing, at least partially visible to an outside of the electronic device, and at least partially extended from an inside of the first housing based on movement of the second housing relative to the first housing in a first direction or inserted into the first housing based on movement of the second housing relative to the first housing in a second direction, a driving module comprising a gear disposed inside the first housing or the second housing and configured to move the second housing in the first direction and/or the second direction based on operation of a driving source, at least one processor, comprising processing circuitry, and at least one memory operably connected to at least one processor. At least one processor, individually and/or collectively, is configured to: receive an input for moving the second housing, and in response to the movement of the second housing in the first direction based on the input or a size of a visible area of the flexible display based on the movement of the second housing being equal to or greater than a set value, display at least one icon corresponding respectively to at least one running application in a partial area of the visible area.

According to an example embodiment, at least one processor, individually and/or collectively, may be configured to display at least one icon corresponding respectively to at least one running application in a partial area of a visible area of the flexible display.

According to an example embodiment, at least one processor, individually and/or collectively, may be configured to receive an input for moving the second housing.

According to an example embodiment, at least one processor, individually and/or collectively, may be configured to: in response to the movement of the second housing in the second direction based on the input or a size of the visible area of the flexible display visible based on the movement of the second housing being less than a set value, reduce an area where the at least one icon is displayed in the partial area, and further control the display to display, in a remaining area of the partial area, at least one icon corresponding respectively to at least one application displayed in an area other than the partial area and/or an icon for displaying icons of all applications installed on the electronic device.

According to an example embodiment, a method for controlling an electronic device includes: receiving an input for moving a second housing disposed to be movable relative to a first housing of the electronic device, and in response to a size of a visible area of a flexible display being equal to or greater than a set value or movement of the second housing in a first direction based on the input, displaying at least one icon corresponding respectively to at least one running application in a partial area of the visible area of the flexible display, the flexible display being at least partially mounted on a surface of the second housing, at least partially visible to an outside of the electronic device, and at least partially extended from an inside of the first housing based on the movement of the second housing relative to the first housing in the first direction or inserted into the first housing based on movement of the second housing relative to the first housing in a second direction.

Various example embodiments of the disclosure, which relate to task bar control based on a slide-in/out motion of a display, may provide a method for displaying a task bar when a screen is a first size or larger and dynamically changing the task bar to a size corresponding to a second size, when the screen is the second size or larger.

Further, various example embodiments of the disclosure, which relate to task bar control based on a slide-in/out motion of a display, may provide an always-visible task bar to enhance device productivity experience for a user.

Further, quick application switching may be provided to the user.

Further, application execution and multi-window execution may be performed quickly by enhancing the usability of the task bar.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
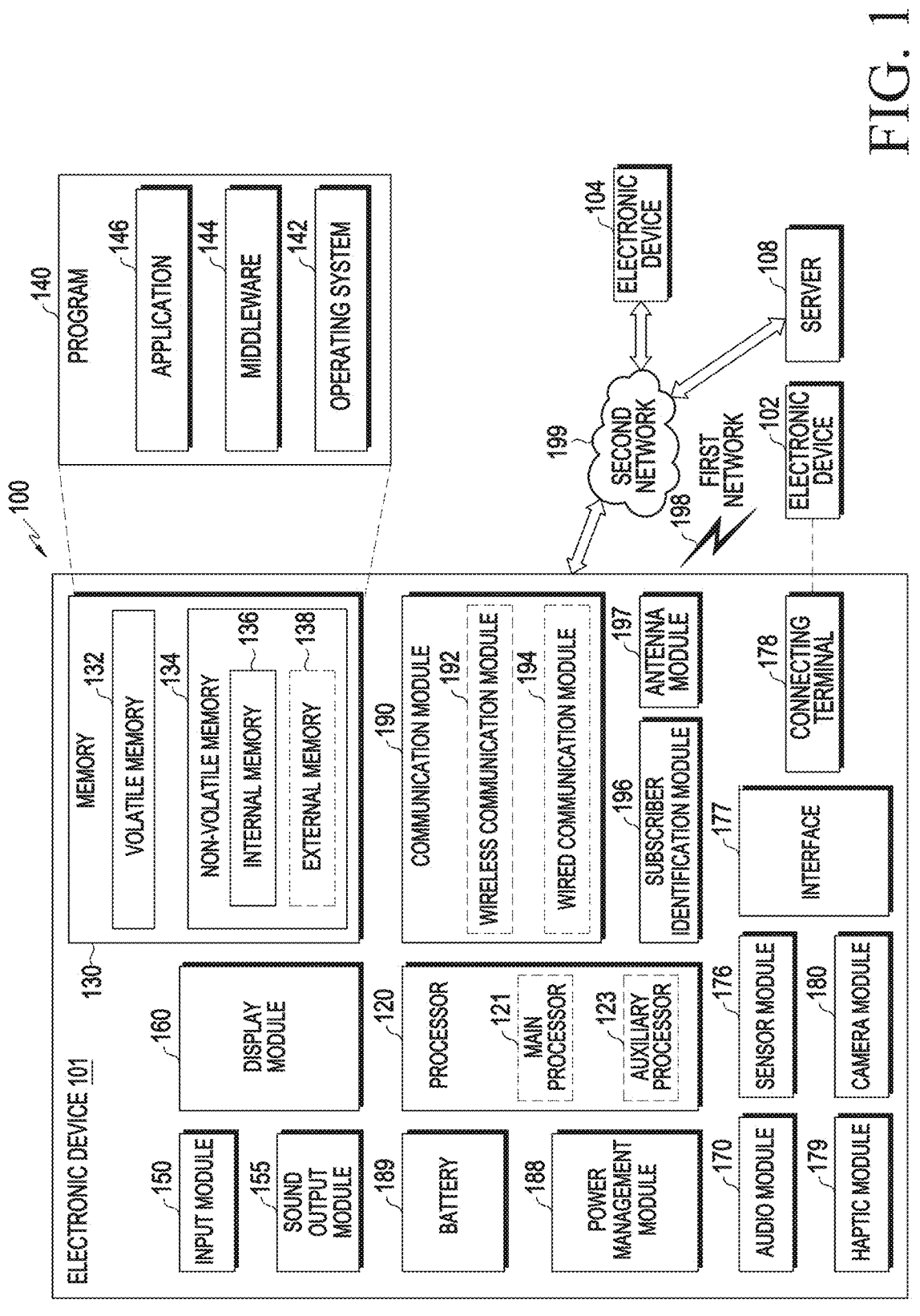
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the strength of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
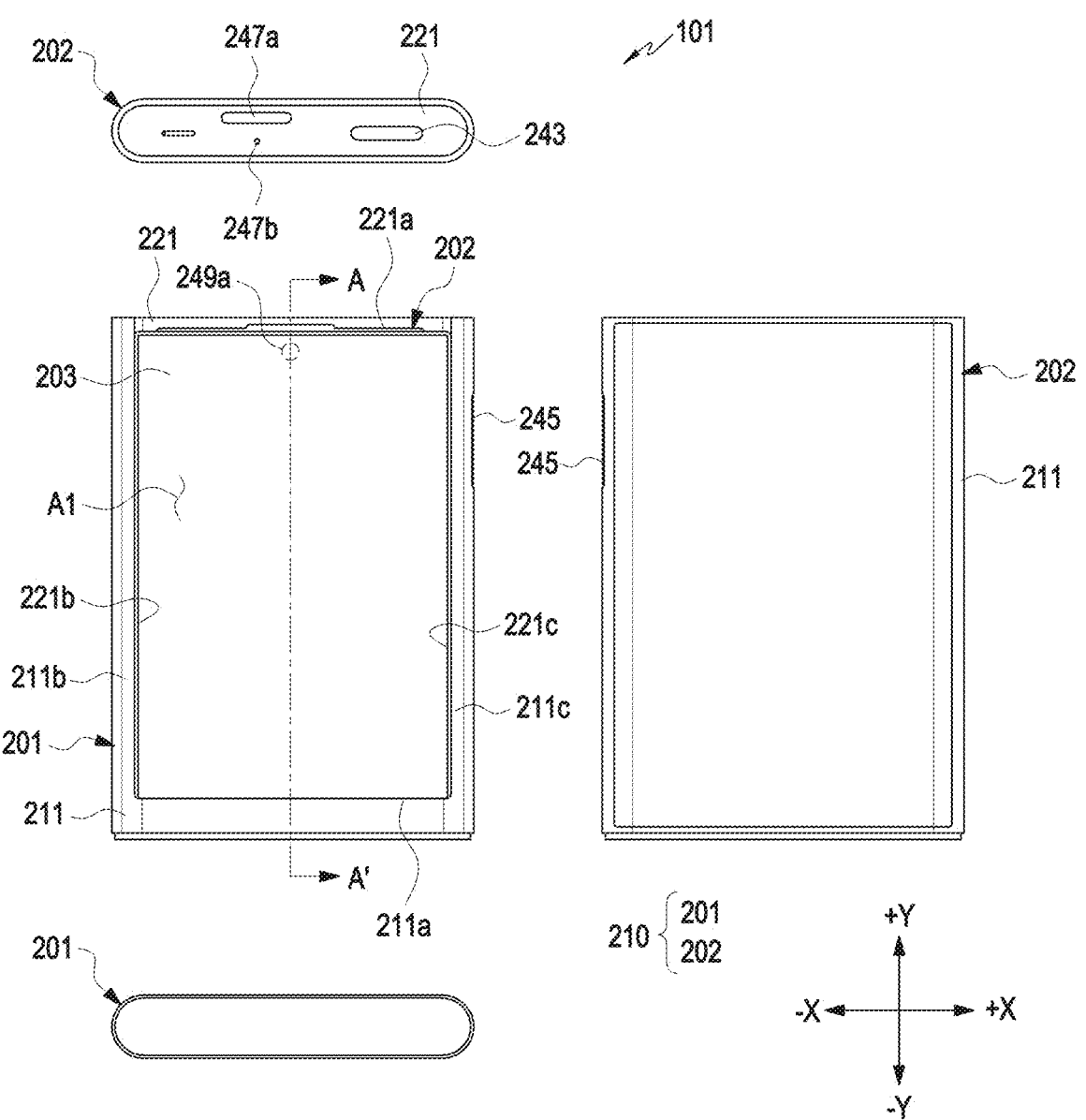
FIG. 2 is a diagram illustrating a state in which a second display area of a display is accommodated inside a housing according to various embodiments.
Figure 3:
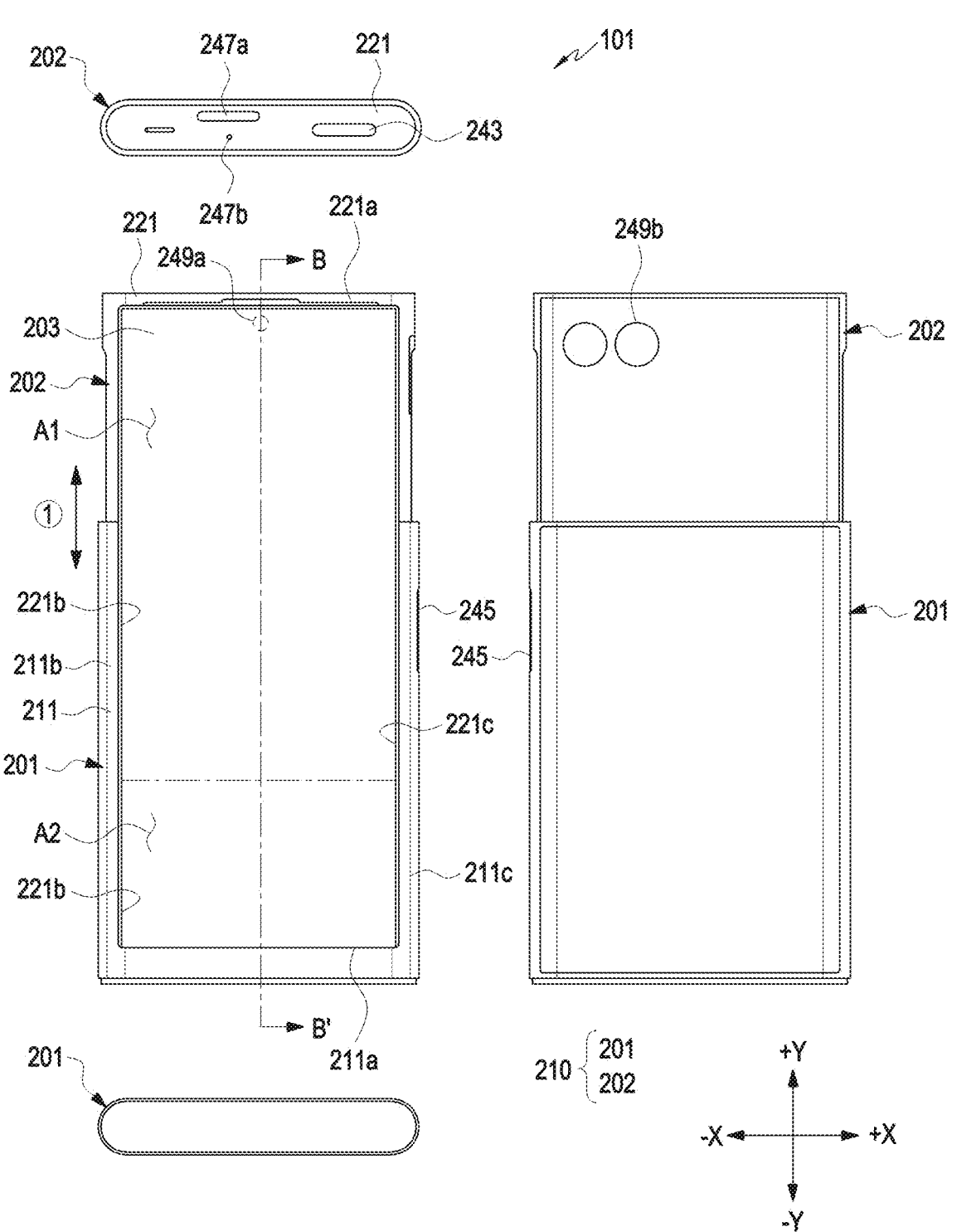
FIG. 3 is a diagram illustrating a state in which a second display area of a display is visible to the outside of a housing according to various embodiments.

FIG. 2 is a diagram illustrating a state in which a second display area of a display is accommodated in a housing according to various embodiments. FIG. 3 is a diagram illustrating a state in which the second display area of the display is visible to the outside of the housing according to various embodiments.

FIGS. 2 and 3 illustrate an example structure in which a display 203 (e.g., a flexible display or rollable display) extends in a longitudinal direction (e.g., +Y direction), when viewed from the front of the electronic device 101. However, the direction of extension of the display 203 is not limited to one direction (e.g., +Y direction). For example, a design modification may be made such that the display 203 is extendable in an upward direction (e.g., +Y direction), a right direction (e.g., +X direction), a left direction (e.g., –X direction), and/or a downward direction (e.g., –Y direction).

The state illustrated in FIG. 2 may be referred to as a closed state of the electronic device 101 or a housing 210 and a slide-in state of the display 203.

The state illustrated in FIG. 3 may be referred to as an open state of the electronic device 101 or the housing 210 and a slide-out state of the display 203.

Referring to FIGS. 2 and 3, the electronic device 101 may include the housing 210. The housing 210 may include a first housing 201 and a second housing 202 disposed to be movable with respect to the first housing 201. In various embodiments, it may be interpreted as a structure in which the first housing 201 is disposed to be slidable with respect to the second housing 202 in the electronic device 101. According to an embodiment, the second housing 202 may be disposed to be reciprocable by a predetermined distance in a direction illustrated with respect to the first housing 201, for example, in a direction indicated by an arrow ①.

According to various embodiments, the second housing 202 may be referred to as a slide part or a slide housing, and movable relative to the first housing 201. According to an embodiment, the second housing 202 may accommodate various electrical and electronic components such as a circuit board or a battery.

According to an embodiment, a motor, a speaker, a SIM socket, and/or a sub-circuit board electrically connected to a main circuit board may be disposed in the first housing 201. The second housing 202 may accommodate the main circuit board with electrical components such as an application processor (AP) and a communication processor (CP) mounted thereon.

According to various embodiments, the first housing may include a first cover member 211 (e.g., a main case). The first cover member 211 may include a $(1\text{-}1)^{th}$ sidewall 211a, a $(1\text{-}2)^{th}$ sidewall 211b extending from the $(1\text{-}1)^{th}$ sidewall 211a, and a $(1\text{-}3)^{th}$ sidewall 211c extending from the $(1\text{-}1)^{th}$ sidewall 211a and substantially parallel to the $(1\text{-}2)^{th}$ sidewall 211b. According to an embodiment, the $(1\text{-}2)^{th}$ sidewall 211b and the $(1\text{-}3)^{th}$ sidewall 211c may be formed substantially perpendicular to the $(1\text{-}1)^{th}$ sidewall 211a.

According to various embodiments, the $(1\text{-}1)^{th}$ sidewall 211a, the $(1\text{-}2)^{th}$ sidewall 211b, and the $(1\text{-}3)^{th}$ sidewall 211c of the first cover member 211 may be formed with one side (e.g., a front surface) open to accommodate (or surround) at least a portion of the second housing 202. For example, the second housing 202 may be at least partially surrounded by the first housing 201 and slide in a direction parallel to a first surface (e.g., a first surface F1 in FIG. 4), for example, in the direction of the arrow ①, while being guided by the first housing 201. According to an embodiment, the cover member 211, the $(1\text{-}1)^{th}$ sidewall 211a, the $(1\text{-}2)^{th}$ sidewall 211b, and/or the $(1\text{-}3)^{th}$ sidewall 211c may be integrally formed. According to an embodiment, the first cover member 211, the $(1\text{-}1)^{th}$ sidewall 211a, the $(1\text{-}2)^{th}$ sidewall 211b, and/or the $(1\text{-}3)^{th}$ sidewall 211c may be formed as separate housings and combined or assembled.

According to various embodiments, the first cover member 211 may be formed to surround at least a portion of the display 203. For example, at least a portion of the display 203 may be formed to be surrounded by the $(1\text{-}1)^{th}$ sidewall 211a, the $(1\text{-}2)^{th}$ sidewall 211b, and/or the $(1\text{-}3)^{th}$ sidewall 211c of the first cover member 211.

According to various embodiments, the second housing 202 may include a second cover member 221 (e.g., a slide plate). The second cover member 221 may have a plate shape and include the first surface (e.g., the first surface F1 in FIG. 4) supporting internal components. For example, the second cover member 221 may support at least a portion (e.g., a first display area A1) of the display 203. According to an embodiment, the second cover member 221 may be referred to as a front cover.

According to an embodiment, the second cover member 221 may include a $(2\text{-}1)^{th}$ sidewall 221a, a $(2\text{-}2)^{th}$ sidewall 221b extending from the $(2\text{-}1)^{th}$ sidewall 221a, and a $(2\text{-}3)^{th}$ sidewall 221c extending from the $(2\text{-}1)^{th}$ sidewall 221a and substantially parallel to the $(2\text{-}2)^{th}$ sidewall 221b. According to an embodiment, the $(2\text{-}2)^{th}$ sidewall 221b and the $(2\text{-}3)^{th}$ sidewall 221c may be formed substantially perpendicular to the $(2\text{-}1)^{th}$ sidewall 221a.

According to various embodiments, as the second housing 202 moves in a first direction (e.g., the direction ①) parallel to the $(1\text{-}2)^{th}$ sidewall 211b or the $(1\text{-}2)^{th}$ sidewall 211c, the second housing 202 may form the open state and closed state of the housing 210. The second housing 202 may move to be located at a first distance from the $(1\text{-}1)^{th}$ sidewall 211a in the closed state and at a second distance larger than the first distance from the $(1\text{-}1)^{th}$ sidewall 211a in the open state. In various embodiments, the first housing 201 may surround a portion of the $(2\text{-}1)^{th}$ sidewall 221a.

According to various embodiments, the electronic device 101 may include the display 203, key input devices 245, a connector hole 243, audio modules 247a and 247b, or camera modules 249a and 249b. According to an embodiment, the electronic device 101 may further include an indicator (e.g., an LED device) or various sensor modules.

According to various embodiments, the display 203 may include the first display area A1 which is visible all the time and a second display area A2 configured to be visible to the outside of the electronic device based on sliding movement of the second housing 202. The terms "visible" and "exposed" may be used interchangeably throughout the disclosure and includes a situation in which a display includes a cover layer (e.g., plate, film, etc.) or does not include a cover. According to an embodiment, the first display area A1 may be disposed on the second housing 202. For example, the first display area A1 may be disposed on the second cover member 221 of the second housing 202. According to an embodiment, the second display area A2 may extend from the first display area A1, and as the second housing 202 slides with respect to the first housing 201, the second display area A2 may be accommodated into the first housing 201 (e.g., the slide-in state) or may be exposed to the outside of the electronic device 101 (e.g., the slide-out state).

According to various embodiments, the second display area A2 may move while being guided substantially by an area (e.g., a curved surface 213a in FIG. 4), and may be accommodated into an internal space of the first housing 201 or exposed to the outside of the electronic device 101. According to an embodiment, the second display area A2 may move based on sliding movement of the second housing 202 in the first direction (e.g., the direction indicated by the arrow ①). For example, a portion of the second display area A2 may be deformed into a curved surface at a position corresponding to the curved surface 213a of the first housing 201 during sliding movement of the second housing 202.

According to various embodiments, when viewed from above the second cover member 221 (e.g., a front cover), when the housing 210 is changed from the closed state to the open state (e.g., the second housing 202 slides to extend from the first housing 201), the second display area A2 may form a substantially flat surface with the first display area A1, while gradually being exposed to the outside of the first housing 201. According to an embodiment, the display 203 may be coupled to or disposed adjacent to a touch sensing circuit, a pressure sensor capable of measuring the intensity (pressure) of a touch, and/or a digitizer that detects a magnetic stylus pen. According to an embodiment, regardless of the closed or open state of the housing 210, an exposed portion of the second display area A2 may be located on a portion (e.g., the curved surface 213a in FIG. 4) of the first housing, and maintain the shape of the curved surface at the position corresponding to the curved surface 213a.

According to various embodiments, the key input devices 245 may be located in an area of the first housing 201. Depending on the appearance and a use state, the electronic device 101 may be designed to be without the illustrated key input devices 245 or to include additional key input device(s). According to an embodiment, the electronic device 101 may include a key input device not shown, such as a home key button or a touch pad disposed around the home key button. According to an embodiment, at least some of the key input devices 245 may be disposed on the (1-1)$^{th}$ sidewall 211a, the (1-2)$^{th}$ sidewall 211b, and/or the (1-3)$^{th}$ sidewall 211c of the first housing 201.

According to various embodiments, the connector hole 243 may be omitted according to an embodiment, and may accommodate a connector (e.g., a USB connector) for transmitting power and/or data to and from an external electronic device. According to an embodiment (not shown), the electronic device 101 may include a plurality of connector holes 243, and some of the plurality of connector holes 243 may function as connector holes for transmitting and receiving audio signals to and from an external electronic device. In the illustrated embodiment, the connector hole 243 is disposed on the second housing 202, to which the disclosure is not limited. The connector hole 243 or a connector hole not shown may be disposed on the first housing 201.

According to various embodiments, the audio modules 247a and 247b may include at least one speaker hole 247a or at least one microphone hole 247b. One of the speaker holes 247a may be provided as a receiver hole for voice calls, and the other may be provided as an external speaker hole. The electronic device 101 may include a microphone for obtaining sound, and the microphone may obtain sound external to the electronic device 101 through the microphone hole 247b. According to an embodiment, the electronic device 101 may include a plurality of microphones to detect the direction of sound. According to an embodiment, the electronic device 101 may include an audio module in which the speaker hole 247a and the microphone hole 247b are implemented as a single hole, or include a speaker (e.g., a piezo speaker) without the speaker hole 247a.

Figure 5A:
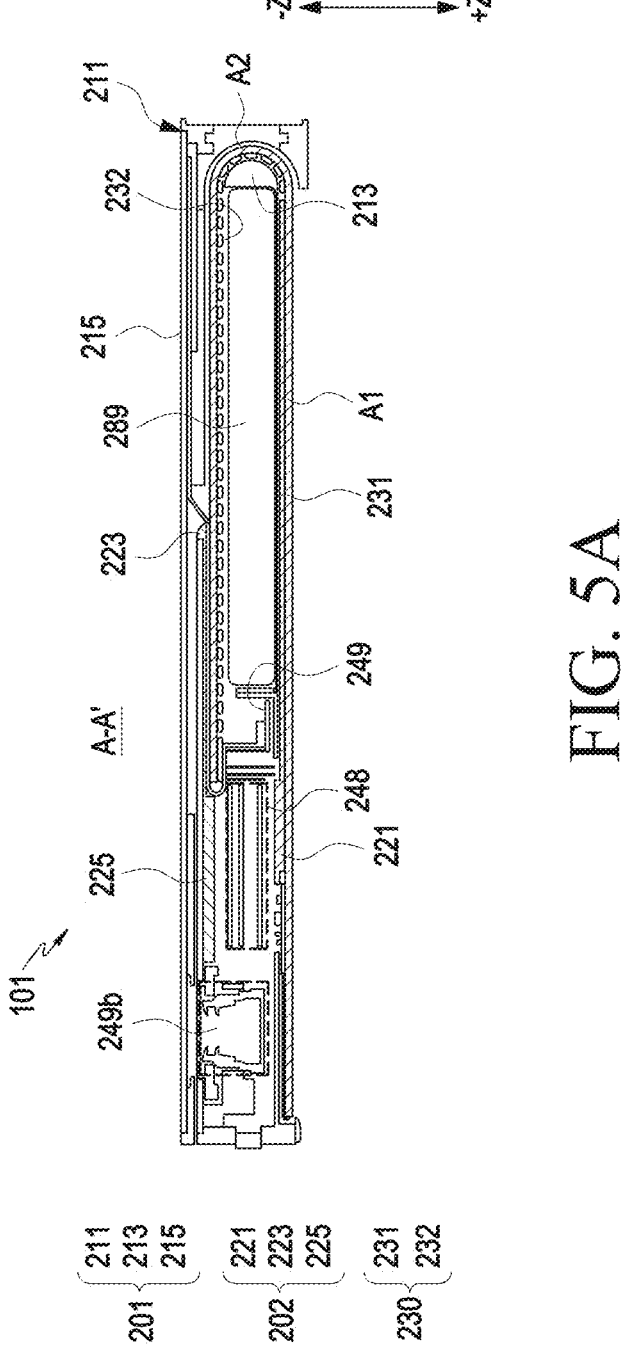
FIG. 5A is a cross-sectional view taken along line A-A' of FIG. 2 according to various embodiments.
Figure 5B:
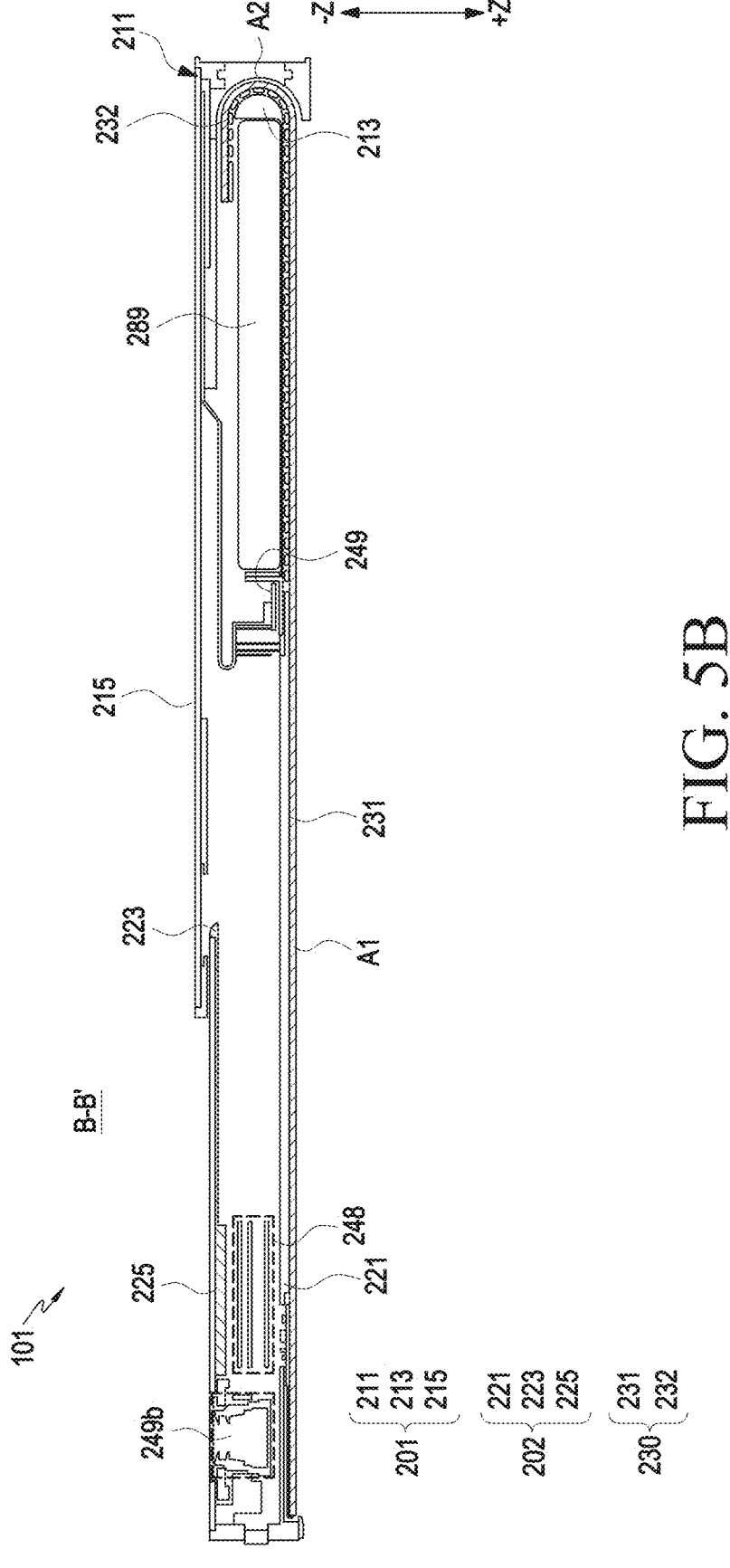
FIG. 5B is a cross-sectional view taken along line B-B' of FIG. 3 according to various embodiments.

According to various embodiments, the camera modules 249a and 249b may include a first camera module 249a (e.g., front camera) and a second camera module 249b (e.g., rear camera) (e.g., the second camera module 249b in FIGS. 5A and 5B). According to an embodiment, the electronic device 101 may include at least one of a wide-angle camera, a telephoto camera, or a close-up camera, and according to an embodiment, include an IR projector and/or an IR receiver to measure a distance to a subject. The camera modules 249a and 249b may include one or more lenses, an image sensor, and/or an image signal processor. The first camera module 249a may be disposed to face in the same direction as the display 203. For example, the first camera module 249a may be disposed around the first display area A1 or in an area overlapping the display 203 and, when disposed in the area overlapping the display 203, may be able to capture a subject through the display 203. According to an embodiment, the first camera module 249a may not be visually exposed to a screen display area (e.g., the first display area A1) and include a hidden under display camera (UDC). According to an embodiment, the second camera module 249a may capture a subject in a direction opposite to the display A1. According to an embodiment, the first camera module 249a and/or the second camera module 249b may be disposed on the second housing 202.

According to various embodiments, an indicator (not shown) of the electronic device 101 may be disposed in the first housing 201 or the second housing 202, and include an LED to provide state information about the electronic device 101 as a visual signal. A sensor module (not shown) of the electronic device 101 may generate an electrical signal or data value corresponding to an internal operational state or an external environmental state of the electronic device 101. The sensor module may include, for example, a proximity sensor, a fingerprint sensor, or a biometric sensor (e.g., an iris/facial recognition sensor or an HRM sensor). In an embodiment, the sensor module may further include at least one of, for example, a gesture sensor, a gyro sensor, a barometric pressure sensor, a magnetic sensor, an acceleration sensor, a grip sensor, a color sensor, an IR sensor, a temperature sensor, a humidity sensor, or an illuminance sensor.

Figure 4:
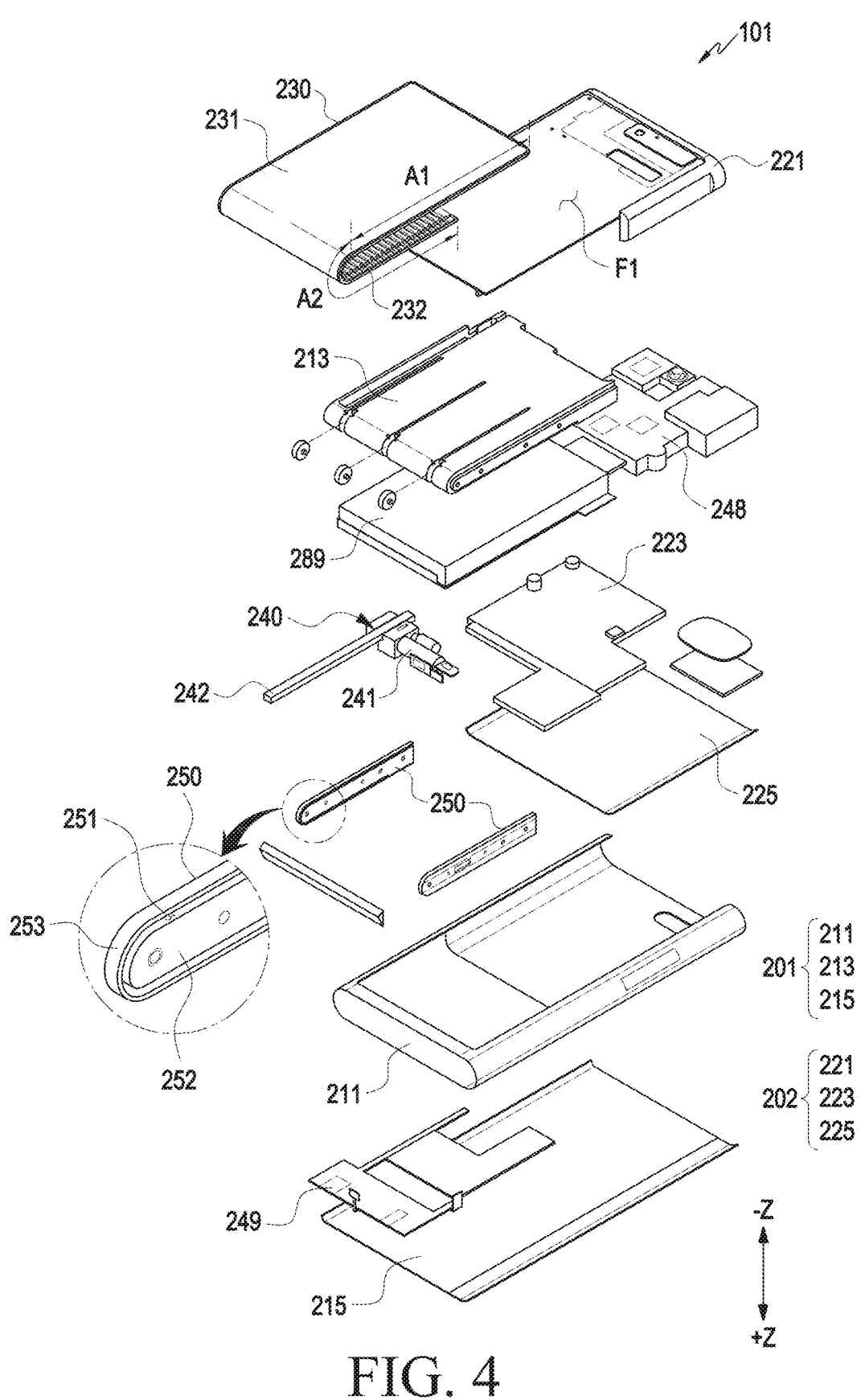
FIG. 4 is an exploded perspective view illustrating an electronic device according to various embodiments.

FIG. 4 is an exploded perspective view illustrating an electronic device according to various embodiments.

FIG. 5A is a cross-sectional view taken along line A-A' of FIG. 2 according to various embodiments.

FIG. 5B is a cross-sectional view taken along line B-B' of FIG. 3 according to various embodiments.

Referring to FIG. 4, FIG. 5A, and/or FIG. 5B, the electronic device 101 may include the first housing 201, the second housing 202, a display assembly 230, and a driving structure 240. The configurations of the first housing 201, the second housing 202, and the display assembly 230 in FIG. 4, FIG. 5A, and/or FIG. 5B may be wholly or partially identical to those of the first housing 201, the second housing 202, and the display 203 in FIG. 2 and/or FIG. 3.

According to various embodiments, the first housing 201 may include the first cover member 211 (e.g., the first cover member 211 in FIGS. 2 and 3), the frame 213, and a first rear plate 215.

According to various embodiments, the first cover member 211 may accommodate at least a portion of the frame 213 and a component (e.g., a battery 289) located on the frame 213. According to an embodiment, the first cover member 211 may be formed to surround at least a portion of the second housing 202. According to an embodiment, a second circuit board 249 accommodating electronic components (e.g., the processor 120 and/or the memory 130 in FIG. 1) may be connected to the first cover member 211.

According to various embodiments, the frame 213 may be connected to the first cover member 211. For example, the frame 213 may be connected to the first cover member 211, and the second housing 202 may move relative to the first cover member 211 and/or the frame 213. According to an embodiment, the frame 213 may accommodate the battery 289. According to an embodiment, the frame 213 may include the curved surface 213a facing the display assembly 230.

According to various embodiments, the first rear plate 215 may substantially form at least a portion of the exterior of the first housing 201 or the electronic device 101. For example, the first rear plate 215 may be coupled to an outer surface of the first cover member 211. According to an embodiment, the first rear plate 215 may provide a decorative effect on the exterior of the electronic device 101. The first rear plate 215 may be manufactured using at least one of metal, glass, synthetic resin, or ceramic.

According to various embodiments, the second housing 202 may include the second cover member 221 (e.g., the second cover member 221 in FIGS. 2 and 3), a rear cover 223, and a second rear plate 225.

According to an embodiment, the second cover member 221 may be connected to the first housing 201 through a guide rail 250 and reciprocate in a straight line in one direction (e.g., the direction of the arrow ① in FIG. 3) while being guided by the guide rail 250.

According to various embodiments, the second cover member 221 may support at least a portion of the display 203. For example, the second cover member 221 may include the first surface F1, and the first display area A1 of the display 203 may be substantially located on the first surface F1 and maintained in a flat shape. According to an embodiment, the second cover member 221 may be formed of a metallic material and/or a non-metallic (e.g., polymer) material. According to an embodiment, a first circuit board 248 accommodating electronic components (e.g., the processor 120 and/or the memory 130 in FIG. 1) may be connected to the second cover member 221.

According to various embodiments, the rear cover 223 may protect components (e.g., the first circuit board 248) located on the second cover member 221. For example, the rear cover 223 may be formed to be connected to the second cover member 221 and surround at least a portion of the first circuit board 248. According to an embodiment, the rear cover 223 may include an antenna pattern to communicate with an external electronic device. For example, the rear cover 223 may include a laser direct structuring (LDS) antenna.

According to various embodiments, the second rear plate 225 may substantially form at least a portion of the exterior of the second housing 202 or the electronic device 101. For example, the second rear plate 225 may be coupled to an outer surface of the second cover member 221. According to an embodiment, the second rear plate 225 may provide a decorative effect on the exterior of the electronic device 101. The second rear plate 225 may be manufactured using at least one of metal, glass, synthetic resin, or ceramic.

According to various embodiments, the display assembly 230 may include a display 231 (e.g., the display 203 in FIG. 2 and/or FIG. 3) and a multi-bar structure 232 supporting the display 231. According to an embodiment, the display 231 may be referred to as a flexible display, a foldable display, and/or a rollable display.

According to various embodiments, the multi-bar structure 232 may be connected or attached to at least a portion (e.g., the second display area A2) of the display 231. According to an embodiment, as the second housing 202 slides, the multi-bar structure 232 may move relative to the first housing 201. In the closed state (e.g., FIG. 2) of the electronic device 101, most of the multi-bar structure 232 may be accommodated in the first housing 201 and located between the first cover member 211 and the second cover member 221. According to an embodiment, at least a portion of the multi-bar structure 232 may move in correspondence with the curved surface 213a located at an edge of the frame 213. According to an embodiment, the multi-bar structure 232 may be referred to as a display support member or a support structure and have a single elastic plate shape.

According to various embodiments, the driving structure 240 may move the second housing 202 relative to the first housing 201. For example, the driving structure 240 may include a motor 241 configured to generate a driving force for sliding movement of the housings 201 and 202. The driving structure 240 may include a gear (e.g., a pinion) connected to the motor 241 and a rack 242 configured to mesh with the gear.

According to various embodiments, a housing in which the rack 242 is located may be different from a housing in which the motor 241 is located. According to an embodiment, the motor 241 may be connected to the second housing 202, and the rack 242 may be connected to the first housing 201. According to an embodiment, the motor 241 may be connected to the first housing 201, and the rack 242 may be connected to the second housing 202.

According to various embodiments, the first housing 201 may accommodate the first circuit board 248 (e.g., the main board). According to an embodiment, a processor, memory, and/or an interface may be mounted on the first circuit board 248. The processor may include, for example, one or more of a CPU, an AP, a GPU, an ISP, a sensor hub processor, or a CP. According to various embodiments, the first circuit board 248 may include a flexible printed circuit board type radio frequency cable (FRC). The first circuit board 248 may be disposed on at least a portion of the second cover member 221 and electrically connected to an antenna module and a communication module.

According to an embodiment, the memory may include, for example, volatile memory or non-volatile memory.

According to an embodiment, the interface may include, for example, an HDMI, a USB interface, an SD card interface, and/or an audio interface. For example, the interface may electrically or physically connect the electronic device 101 to an external electronic device and include a USB connector, an SD card/MMC connector, or an audio connector.

According to various embodiments, the electronic device 101 may include the second circuit board 249 (e.g., sub-circuit board) within the first housing 201, spaced apart from the first circuit board 248 (e.g., the main circuit board). The second circuit board 249 may be electrically connected to the first circuit board 248 through a connecting flexible board. The second circuit board 249 may be electrically connected to electrical components disposed in an end area of the electronic device 101, such as the battery 289 or a speaker and/or a SIM socket, to transmit signals and power. According to an embodiment, the second circuit board 249 may accommodate a wireless charging antenna (e.g., a coil). For example, the battery 289 may receive power from an external electronic device using the wireless charging antenna. In another example, the battery 289 may transfer power to an external electronic device using the wireless charging antenna.

According to various embodiments, the battery 289, which is a device for supplying power to at least one component of the electronic device 101, may be a non-rechargeable primary battery, a rechargeable secondary battery, or a fuel cell. The battery 289 may be disposed integrally within the electronic device 101 or detachably from the electronic device 101. According to an embodiment, the battery 289 may be formed as a single integrated battery or include a plurality of separate batteries. According to an embodiment, the battery 289 may be located on the frame 213 and slide together with the frame 213.

According to various embodiments, the guide rail 250 may guide movement of the multi-bar structure 232. For example, the multi-bar structure 232 may slide along a slit 251 formed on the guide rail 250. According to an embodiment, the guide rail 250 may be connected to the first housing 201. For example, the guide rail 250 may be connected to the first cover member 211 and/or the frame 213. According to an embodiment, the slit 251 may be referred to as a groove or recess formed on an inner surface of the guide rail 250.

According to various embodiments, the guide rail 250 may provide pressure to the multi-bar structure 232 based on driving of the motor 241.

According to an embodiment, when the electronic device 101 is changed from the closed state to the open state, an inner portion 252 of the guide rail 250 may provide pressure to the multi-bar structure 232. The multi-bar structure 232 provided with pressure may move along the slit 251 of the guide rail 250, and the second housing 202 may be changed from the slide-in state to the slide-out state with respect to the first housing 201. At least a portion of the display assembly 230 accommodated between the first cover member 211 and the frame 213 may extend to the front surface.

According to an embodiment, when the electronic device 101 is changed from the open state to the closed state, an outer portion 253 of the guide rail 250 may provide pressure to the bent multi-bar structure 232. The multi-bar structure 232 provided with pressure may move along the slit 251 of the guide rail 250, and the second housing 202 may be changed from the slide-out state to the slide-in state with respect to the first housing 201. At least a portion of the display assembly 230 may be accommodated between the first cover member 211 and the frame 213.

Referring to FIG. 5A, when the electronic device 101 is in the closed state, at least a portion of the second housing 202 may be disposed to be accommodated in the first housing 201. As the second housing 202 is disposed to be accommodated in the first housing 201, the overall volume of the electronic device 101 may be reduced. According to an embodiment, when the second housing 202 is accommodated in the first housing 201, the size of the visually exposed display 231 may be minimized and/or reduced. For example, when the second housing 202 is fully accommodated in the first housing 201, the first display area A1 of the display 231 may be visually exposed, and the second display area A2 may not be visually exposed. At least a portion of the second display area A2 may be located between the battery 289 and the rear plates 215 and 225.

Referring to FIG. 5B, when the electronic device 101 is in the open state, at least a portion of the second housing 202 may protrude from the first housing 201. As the second housing 202 protrudes from the first housing 201, the overall volume of the electronic device 101 may increase. According to an embodiment, when the second housing 202 protrudes from the first housing 201, at least a portion of the second display area A2 of the display 231 may be visually exposed together with the first display area A1 to the outside of the electronic device 101.

Figure 6:
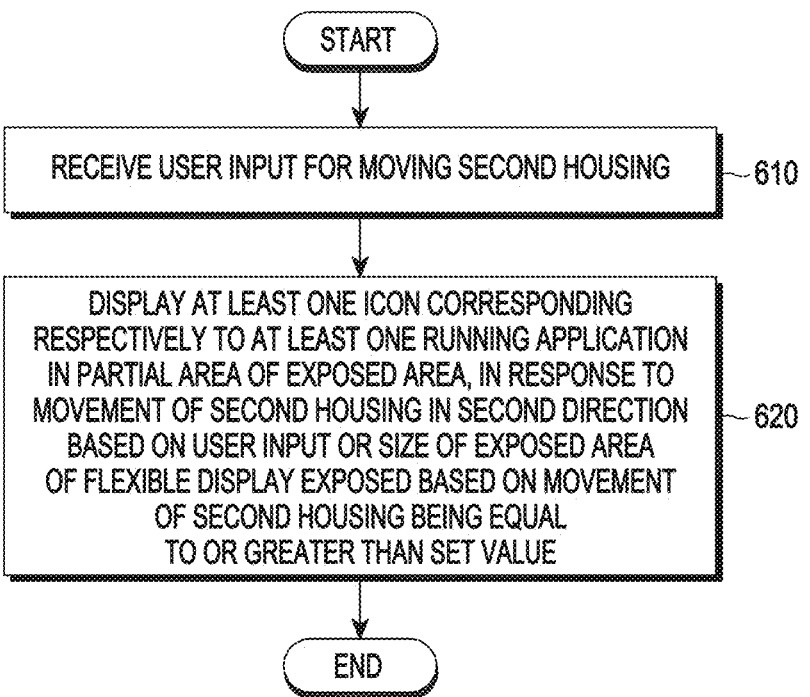
FIG. 6 is a flowchart illustrating an example icon display operation based on an open state of an electronic device according to various embodiments.

FIG. 6 is a flowchart illustrating an example icon display operation based on the open state of an electronic device according to various embodiments.

According to an embodiment, referring to FIG. 6, the electronic device (e.g., the electronic device 101 in FIG. 1, the electronic device 101 in FIG. 2, or the processor 120 in FIG. 1) may receive an input (e.g., a user input) for moving a second housing (e.g., the second housing 202 in FIG. 2) in operation 610. For example, the user input for moving the second housing may include at least one of a button input, a touch input, a gesture input, an external input (e.g., hovering, air gesture, or air pointer) from an external electronic device (e.g., a stylus pen), an input by a wireless communication (e.g., Bluetooth) button, a voice input, or a specified context. According to an embodiment, the electronic device may receive a user input of touching a button (e.g., a physical key and/or a soft key) for moving the second housing relative to a first housing (e.g., the first housing 201 in FIG. 2). According to an embodiment, the electronic device may receive a user input for moving the second housing, while an application is running.

According to an embodiment, the electronic device may be a vertical-rollable (V-rollable) electronic device. In an embodiment, a V-rollable electronic device may refer to a device that slides in (e.g., an operation of switching from the open state to the closed state of the electronic device or a housing) or slides out (e.g., an operation of switching from the closed state to the open state of the electronic device or the housing) in a direction parallel to a direction of the longer of horizontal and vertical lengths of the electronic device. According to an embodiment, when the vertical length of the electronic device is longer, the electronic device may slide in or out in a vertical direction. In an embodiment, the electronic device may have an aspect ratio (e.g., vertical-horizontal) such as 4.5:3, 16:9, or 21:9.

According to an embodiment, in response to the movement of the second housing in a second direction based on the user input or the size of an exposed area of a flexible display (e.g., the display module 160 in FIG. 1 or the display 203 in FIG. 2) exposed based on the movement of the second housing being equal to or greater than a set value, the electronic device may display at least one icon corresponding respectively to at least one running application in a partial area of the exposed area of the flexible display, in operation 620.

According to an embodiment, the electronic device may obtain state information about the electronic device to display a button (e.g., an icon) corresponding to a running application in an area of the display. According to an embodiment, displaying a button corresponding to a running application in an area of the display may be referred to as an operation of displaying a multi-interaction area. Hereinafter, this may be referred to as a 'task bar' display operation. According to an embodiment, the multi-interaction area (e.g., task bar) may include at least one icon corresponding respectively to at least one running application and be displayed in a partial area of the exposed area of the flexible display. According to an embodiment, execution screens of at least some of running applications may not be displayed on the display.

According to an embodiment, the electronic device may obtain state information (e.g., whether a fixing function or a hiding function has been set) related to the multi-interaction area (e.g., task bar). According to an embodiment, the structure of the task bar and the fixing function or hiding function will be described below in detail with reference to FIGS. 7A and 7B.

Figure 8A:
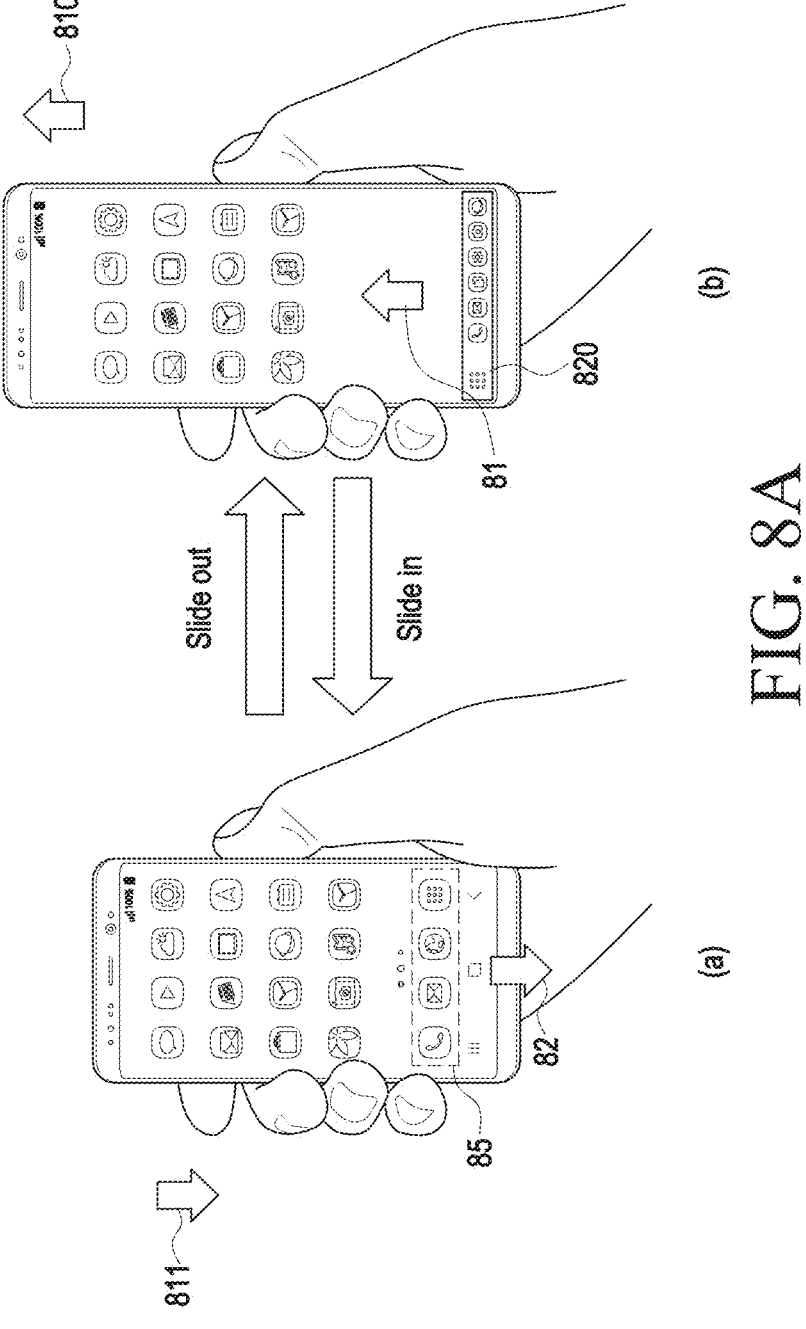
FIG. 8A is a diagram illustrating an example icon display operation based on an open state of an electronic device according to various embodiments.
Figure 8B:
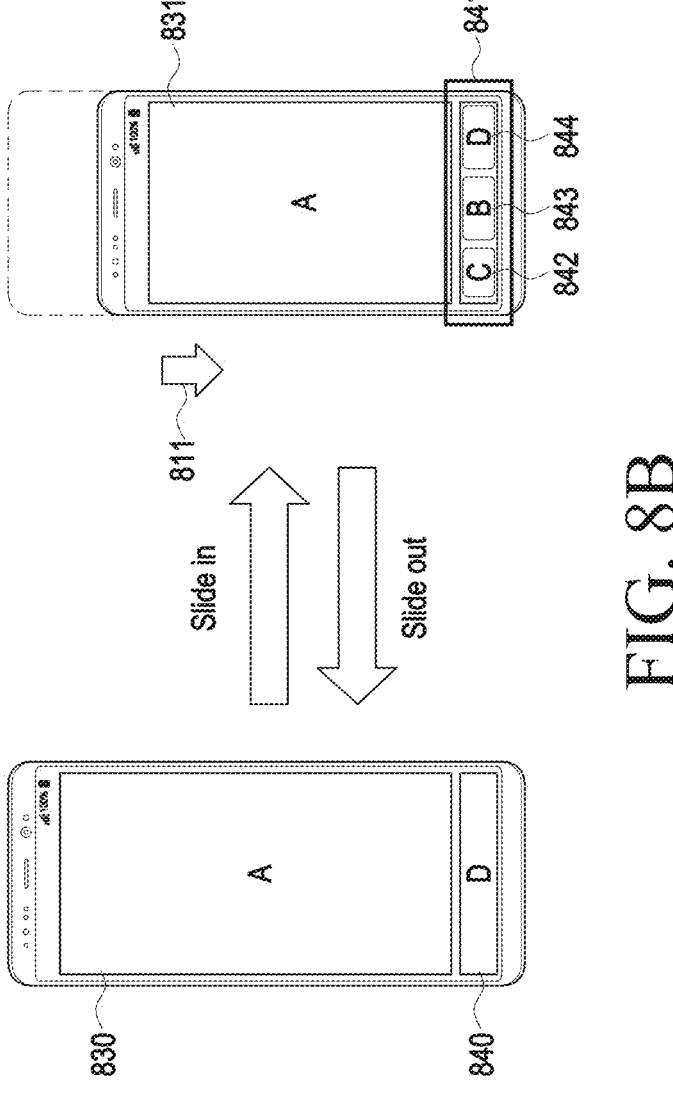
FIG. 8B is a diagram illustrating an example icon display operation based on a closed state of an electronic device according to various embodiments.
Figure 8C:
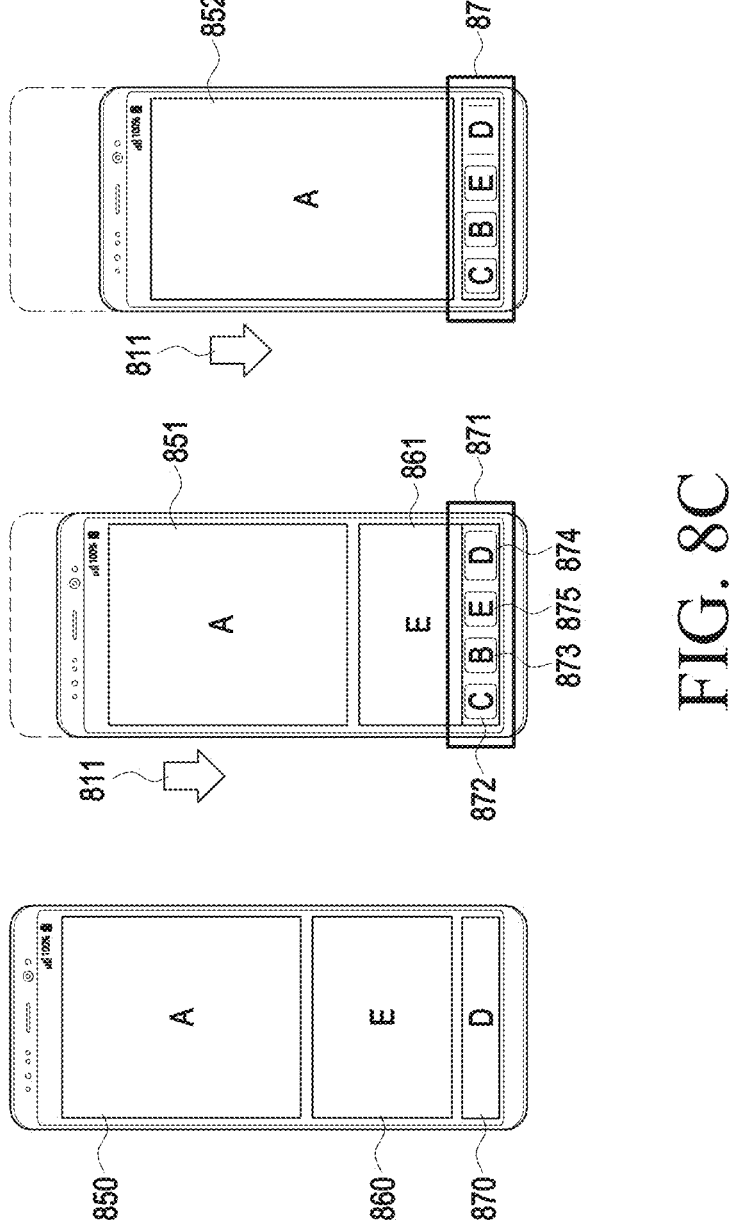
FIG. 8C is a diagram illustrating an example icon display operation based on a closed state of an electronic device according to various embodiments.

According to an embodiment, the electronic device may control display or hiding of the task bar based on a slide-in motion or a slide-out motion. According to an embodiment, the electronic device may hide the task bar during the slide-in motion. According to an embodiment, when the slide-out motion is performed or the size of the exposed area of the flexible display is equal to or greater than a set value, the electronic device may display the task bar for n seconds. According to an embodiment, the electronic device may control the task bar in consideration of a running application during the slide-out motion. According to an embodiment, the electronic device may control the task bar based on a grip direction of a hand. According to an embodiment, the size of the exposed area of the flexible display may refer to a ratio of the vertical to horizontal length (e.g., aspect ratio) of the exposed area, and may refer to only the vertical length in the case of a V-rollable electronic device, since the horizontal length does not change. According to an embodiment, the electronic device may control the task bar based on the slide-in motion or the slide-out motion of the electronic device, as illustrated in FIGS. 8A, 8B and 8C. According to an embodiment, at least some of the illustrated components may be changed depending on a platform included in the electronic device.

For example, the number of at least one icon included in the task bar may vary depending on a size of the flexible display.

For example, when the exposed area of the flexible display is smaller than a set size, the electronic device may activate the task bar hiding function.

Figure 7A:
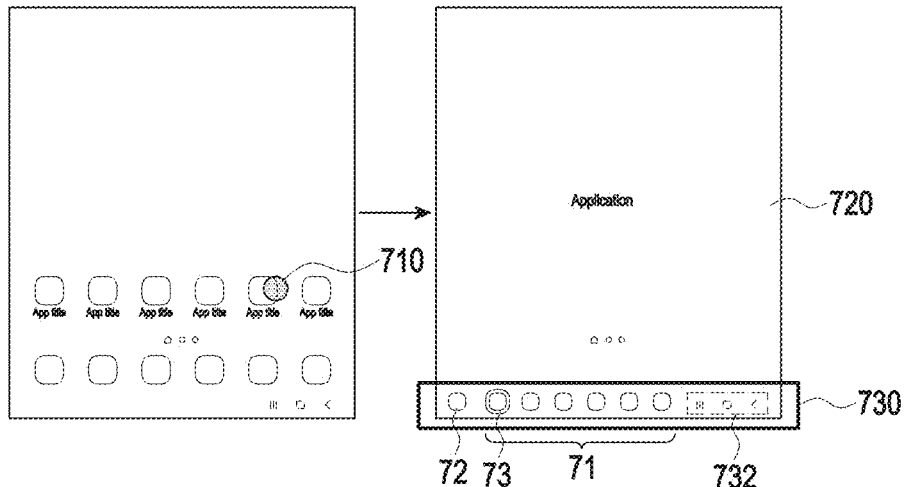
FIG. 7A is a diagram illustrating an example icon display operation in an electronic device according to various embodiments.

FIG. 7A is a diagram illustrating an example icon display operation in an electronic device according to various embodiments. For example, FIG. 7A is a diagram illustrating an example structure of a task bar including an icon of a running application.

Referring to FIG. 7A, the electronic device (e.g., the electronic device 101 in FIG. 1, the electronic device 101 in FIG. 2, or the processor 120 in FIG. 1) may select one icon 710 from among a plurality of application icons corresponding to a plurality of executable applications, respectively and execute an application corresponding to the selected icon 710. According to an embodiment, the plurality of application icons may be displayed on a home screen or an application icon list screen.

According to an embodiment, the electronic device may display a screen 720 of the application corresponding to the selected icon 710.

According to an embodiment, the electronic device may display a task bar 730 including icons representing running applications in a partial area of an exposed area of a flexible display (e.g., the display module 160 in FIG. 1 or the display 203 in FIG. 2) based on an extension direction of the electronic device and/or an aspect ratio of the flexible display. According to an embodiment, the electronic device may display the task bar 730 by overlaying it on the application screen 720 or may display the application screen 720 in an area other than an area where the task bar 730 is displayed.

According to an embodiment, when an application is executed, the task bar 730 may be provided. According to an embodiment, the task bar 730 may be turned on/off according to a setting. According to an embodiment, a hiding function may be provided for the task bar 730 to hide the task bar 730, when needed. The hiding function will be described below with reference to FIG. 7B. According to an embodiment, the task bar 730 may include at least one button 71 related to at least one running application, respectively. For example, the button may be in the form of an icon of an application. According to an embodiment, the at least one button 71 may include an icon 73 representing the application corresponding to the application screen 720 being displayed, and an icon of at least one running application with an execution screen not being displayed. The at least one icon may be arranged based on an execution order of the at least one application.

According to an embodiment, the task bar 730 may include a navigation bar 732 including a button for identifying recently executed applications, a button for moving to a home screen, and a button for moving to a previous screen.

According to an embodiment, the task bar 730 may include a favorite function. According to an embodiment, when the task bar 730 is displayed, at least one button related to the favorite function included in the task bar 730 may always be displayed and include at least one application button. According to an embodiment, at least one application button included in the favorite function of the task bar 730 may be selected by a user.

For example, the favorite function (e.g., Favorite app) may include at least one of app shortcut, deep link shortcut, contact shortcut, Internet bookmark shortcut, my files shortcut, folder, or paired app.

According to an embodiment, when an application included in the favorite function is selected, an execution screen of the selected application may be displayed in full screen. According to an embodiment, when the screen of the application being used is dragged, a display area may be divided into a plurality of areas and changed to a multi-window mode in which execution screens of different applications are displayed in the plurality of divided areas, respectively.

According to an embodiment, the task bar 730 may include an application button 72. According to an embodiment, the electronic device may include the application button 72 in the task bar 730 to display a plurality of icons related to all executable applications so that when using a specific application that is not on the task bar 730, the user may execute the application. According to an embodiment, the application button 72 may be located on a left side of the task bar 730. According to an embodiment, when a button for displaying all application icons that are always displayed on the home screen is included in the task bar 730, the button for displaying all application icons may be displayed at a position on the task bar 730, which corresponds to a position where the button for displaying all application icons is displayed on the home screen.

According to an embodiment, the electronic device may fix the task bar 730. According to an embodiment, in the case where the task bar 730 is set to be fixed in a partial area of the screen, when the size of the screen becomes equal to or greater than a set value according to the slide-out motion, the electronic device may display the task bar 730 in the partial area of the screen, and display an application execution screen in an area other than the partial area of the screen or display the task bar 730 by overlaying it on the application execution screen.

Figure 7B:
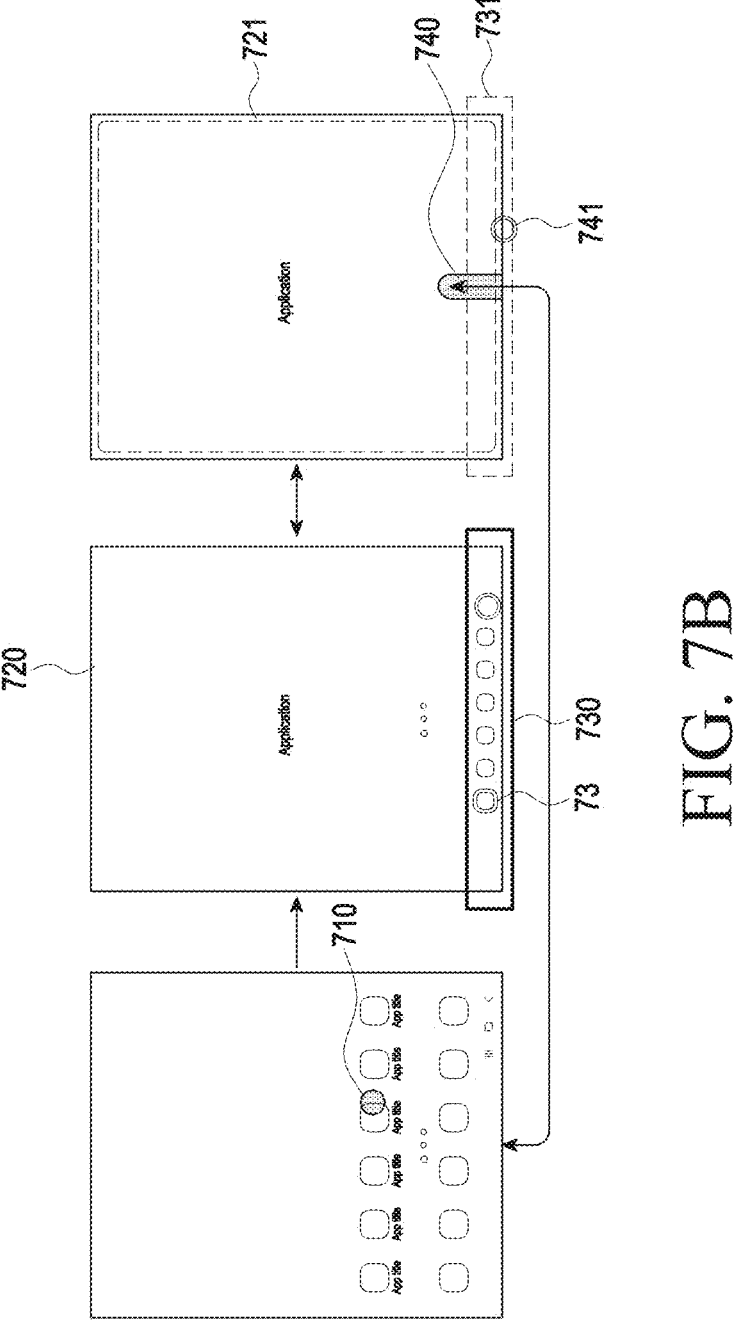
FIG. 7B is a diagram illustrating an example operation of displaying or hiding an icon in an electronic device according to various embodiments.

FIG. 7B is a diagram illustrating an example operation for displaying or hiding an icon in an electronic device according to various embodiments.

Referring to FIG. 7B, the electronic device (e.g., the electronic device 101 in FIG. 1, the electronic device 101 in FIG. 2, or the processor 120 in FIG. 1) may select one icon 710 from among a plurality of application icons corresponding to a plurality of executable applications, respectively and execute the application corresponding to the selected icon 710. According to an embodiment, the plurality of application icons may be displayed on a home screen or an application icon list screen.

According to an embodiment, the electronic device may display the screen 720 of the application corresponding to the selected icon 710.

According to an embodiment, the electronic device may display the task bar 730 including an icon representing a running application in a partial area of an exposed area of a flexible display (e.g., the display module 160 in FIG. 1 or the display 203 in FIG. 2) based on an extension direction of the electronic device and/or an aspect ratio of the flexible display. According to an embodiment, the electronic device may display the task bar 730 by overlaying it on the application screen 720 or display the application screen 720 in an area other than an area where the task bar 730 is displayed. According to an embodiment, at least one button included in the task bar 730 may include the icon 73 representing the application corresponding to the application screen 720 being displayed.

According to an embodiment, the electronic device may display or hide the task bar 730. According to an embodiment, the task bar 730 may be displayed or hidden based on a touch or gesture.

According to an embodiment, in the case where the task bar 730 is set to be hidden, when the size of the screen becomes equal to or greater than a set value based on the slide-out motion, the electronic device may display the task bar 730 to be overlaid in a partial area of the application execution screen, while the application execution screen 720 is displayed in full screen, or may display the application execution screen in an area other than the area where the task bar 730 is displayed. According to an embodiment, when a user input for hiding the task bar 730 is received or a set time (e.g., n seconds where n is a natural number) elapses after the task bar 730 is displayed, the electronic device may hide the displayed task bar 730. According to an embodiment, hiding the task bar 730 may be an operation of deleting at least one icon included in the task bar 730 from the screen. According to an embodiment, when the task bar 730 is hidden, the electronic device may display an application execution screen 721 up to an area 731 where the task bar 730 was located.

According to an embodiment, when a user input 740 or 741 (e.g., swipe, touch, or long press) for displaying the task bar is received in the area where the task bar 730 is hidden, the electronic device may display the hidden task bar 730.

FIG. 8A is a diagram illustrating an example icon display operation based on the open state of an electronic device according to various embodiments. For example, FIG. 8A (a) illustrates the closed state of the electronic device, and FIG. 8A (b) illustrates the open state of the electronic device.

Referring to FIG. 8A, when receiving a user input for switching the closed state illustrated in FIG. 8A (a) to the open state illustrated in FIG. 8A (b), the electronic device (e.g., the electronic device 101 in FIG. 1, the electronic device 101 in FIG. 2, or the processor 120 in FIG. 1) may perform a slide-out motion by moving a second housing (e.g., the second housing 202 in FIG. 2) away from a first housing (e.g., the first housing 201 in FIG. 1) in a first direction 810.

According to an embodiment, the electronic device may receive a user input for moving the second housing. For example, the electronic device may control a linear motion of the second housing relative to the first housing of the electronic device based on a user input event (e.g., a button touch), while executing at least one application. The electronic device may control a slide motion of the second housing relative to the first housing of the electronic device based on the user input event. In various embodiments of the disclosure, the rollable display is described as extending along the vertical axis (e.g., the Y axis in FIG. 2) of the electronic device, by way of example, to which the disclosure is not limited.

According to an embodiment, a V-rollable display may extend along the Y axis of the electronic device. A motor may make a rotational motion relative to the X axis, and the second housing may move by a linear motion along the Y axis.

According to an embodiment, the electronic device may perform a slide-in motion or a slide-out motion based on the detected event.

According to an embodiment, the user input event may include at least one of a button, a touch, a gesture, voice, an external input (e.g., hovering, air gesture, or air pointer) of an electronic pen, or wireless communication (e.g., a BT button).

According to an embodiment, the electronic device may perform the slide-in or slide-out motion based on a user input event of pressing a power button.

According to an embodiment, the electronic device may perform the slide-in or slide-out motion based on a context (e.g., a time or position at which a user input event is detected, a running application, or content being displayed).

According to an embodiment, the electronic device may include a driving module that moves the second housing relative to the first housing. According to an embodiment, the driving module may include a motor, a motor gear unit, and a gear unit.

According to an embodiment, the motor and the motor gear unit may be disposed in the second housing. In an embodiment, the motor gear unit may mesh with the gear unit and transfer driving of the motor to the gear unit. According to an embodiment, the motor may rotate the motor gear unit based on a signal received from a processor (e.g., the processor 120 in FIG. 1).

According to an embodiment, the gear unit may include a rack gear unit. For example, the gear unit may be disposed on the rear surface of the second plate included in the second housing 202 and slide the second plate of the second housing

202 by moving linearly according to the driving of the motor. For example, the gear unit may convert a rotational motion of the motor into a linear motion. The gear unit may move the second plate in a linear direction. According to an embodiment, the first housing 201 may slide relative to the second housing 202. According to an embodiment, the gear unit may be disposed on the rear surface of the first plate included in the first housing 201 and slide the first plate of the first housing 201 by moving linearly according to the driving of the motor. For example, the gear unit may convert a rotational motion of the motor into a linear motion. The gear unit may move the first plate in a linear direction.

According to an embodiment, the electronic device may track a movement direction and movement distance of the second housing relative to the first housing. According to an embodiment, the electronic device may obtain movement distance information about the housing using sensor information based on an external factor event (magnetic force or magnetization). For example, the electronic device may obtain the movement distance of the second housing relative to the first housing by a phase difference of Hall ICs (e.g., four Hall ICs) disposed in the first housing and/or the second housing. According to an embodiment, the electronic device may calculate the movement distance using a 4-Hall IC raw data combination algorithm.

According to an embodiment, the electronic device may control an operation of displaying the task bar in a first direction and/or a second direction based on movement information about the housing.

According to an embodiment, the electronic device may display at least one icon 820 in a partial area of an exposed area of the flexible display in response to movement (e.g., slide-out motion) of the second housing in the first direction 810 (81). For example, the electronic device may display the at least one icon 820 by moving the at least one icon 820 outside the screen to a partial area of the exposed area (81). According to an embodiment, the electronic device may display the at least one icon 820 in a partial area of the exposed area of the flexible display, including a lower edge area. According to an embodiment, the at least one icon 820 may be displayed in a partial area of the exposed area of the flexible display, including a left edge area or a right edge area.

According to an embodiment, when the electronic device is in the closed state as illustrated in FIG. 8A (a), the electronic device may display an area 85 (e.g., a hotseat area) with at least one icon fixed therein in a partial area of a home screen. According to an embodiment, the at least one icon included in the area 85 with the at least one icon fixed therein may be set by the user.

According to an embodiment, in response to the movement of the second housing in the first direction 810 (e.g., slide-out motion) as illustrated in FIG. 8A (b), the at least one icon 820 displayed on the display may include at least one icon included in the area 85 with the at least one icon fixed therein. For example, the at least one icon 820 displayed in the open state may include an icon of a phone application, an icon of a message application, and an icon of a browser application included in the area 85 with the at least one icon fixed therein.

According to an embodiment, at least one icon included in the area 85 with the at least one icon fixed therein in the closed state may be included in the at least one icon 820 displayed in the open state in an order in which it was displayed in the closed state, or in an order based on user preferences.

According to an embodiment, the electronic device may display at least one icon in a partial area of an exposed area, in response to movement of the second housing in a second direction 811 (e.g., slide-in motion) and the size of the exposed area of the flexible display being equal to or greater than a set value. According to an embodiment, the electronic device may not display the at least one icon, in response to the movement of the second housing in the second direction 811 and the size of the exposed area of the flexible display being less than the set value. For example, the electronic device may hide the at least one displayed icon in response to the movement of the second housing in the second direction 811 and the size of the exposed area of the flexible display being less than the set value (82). For example, the electronic device may hide the at least one icon 820 in a manner that moves the at least one icon 820 out of the screen (82). According to an embodiment, displaying the at least one icon may include an operation of displaying the task bar 820.

According to an embodiment, the electronic device may determine whether the size of the exposed area of the flexible display is equal to or greater than the set value based on whether the length of a boundary, which is changed by a slide motion in the exposed area, is equal to or greater than a set value. According to an embodiment, the electronic device may measure the length of the boundary, which is changed by a slide motion, by tracking a movement distance based on the slide motion.

According to an embodiment, when the second housing moves in the second direction 811 to switch from the open state to the closed state, the task bar 820 may disappear from the screen. According to an embodiment, when the task bar was not displayed in the open state, the electronic device may not display the task bar even if the slide-in motion is performed, and when the task bar was displayed in the open state, the electronic device may make the task bar disappear from the screen 82 based on the slide-in motion.

According to an embodiment, when the second housing moves in the first direction 810 to switch from the closed state to the open state, the task bar 820 may be displayed on the screen (81). According to an embodiment, the task bar 820 may be displayed on the screen for N seconds and then disappear. According to an embodiment, when the task bar was not displayed in the closed state, the electronic device may display the task bar 820 in a partial area of the screen based on the slide-out motion, and when the task bar 820 was displayed in the closed state, the electronic device may maintain the task bar 820 displayed even if the slide-out motion is performed.

While when the second housing moves in the second direction 811 (e.g., the slide-in motion), the task bar is not displayed in FIG. 8A, the task bar may be displayed depending on the size of the screen, even when the second housing moves in the second direction. For example, even if the second housing moves in the second direction, when the size of the screen (the vertical length of the screen or the ratio between the horizontal length and vertical length of the screen) is equal to or greater than a set value, the electronic device may display the task bar in a partial area of the screen based on the slide motion. According to an embodiment, the operation of displaying the task bar when the second housing moves in the second direction will be described in greater detail below with reference to FIGS. 8B and 8C.

According to an embodiment, the electronic device may control the operation of displaying the task bar based on a context (e.g., a running application, content being displayed, a hand grip direction, the state of the electronic device, or the size of the exposed area) during the slide motion.

For example, the electronic device may determine a position where the task bar is displayed based on the hand grip direction. According to an embodiment, the operation of displaying the task bar according to the hand grip direction will be described in greater detail below with reference to FIGS. 9 and 10.

According to an embodiment, the electronic device may turn off the task bar function and set a screen brightness to dark, when using an ultra-low power mode.

According to an embodiment, when a connection to an external electronic device (e.g., a car or wireless earphones) is detected, the electronic device may display a task bar in which an icon of an application related to the connected external electronic device (e.g., a navigation application when connected to a car and a music play application when connected to wireless earphones) is disposed with high priority.

According to an embodiment, when the electronic device detects a change in location information (e.g., GPS information or geo-fence) about the electronic device (e.g., arriving at work or home), the electronic device may display a task bar in which an icon of an application related to the changed geo-fence information (e.g., a reminder application when arriving at work or a smart device control application when arriving at home) is disposed with high priority.

According to an embodiment, the electronic device may determine the number of at least one icon included in the task bar based on a size of the flexible display. For example, when the size of the exposed area is a first size according to the slide-out motion, the electronic device may display a task bar in which a plurality of icons are arranged in one row. According to an embodiment, when the size of the exposed area is a second size greater than the first size according to the slide-out motion, the electronic device may display a task bar in which more icons are arranged in two rows. According to an embodiment, a larger task bar may be displayed when the size of the exposed area is the second size than when the size of the exposed area is the first size.

According to an embodiment, when the size of the exposed area of the flexible display is equal to or less than a set size, the electronic device may activate the task bar hiding function.

FIG. 8B is a diagram illustrating an example icon display operation based on the closed state of an electronic device according to various embodiments.

Referring to FIG. 8B, the electronic device may display a home screen 830 (e.g., area A) and a navigation bar 840 (e.g., area D) in the open state. For example, the home screen may include at least one icon corresponding respectively to at least one application and a fixed application icon area (e.g., a single interaction area or a hotseat area).

According to an embodiment, the navigation bar 840 may include a button for identifying recently executed applications, a button for moving to a home screen, and a button for moving to a previous screen.

According to an embodiment, when a user input for switching from the open state to the closed state is received, the electronic device may perform a slide-in motion by moving a second housing (e.g., the second housing 202 in FIG. 2) in a second direction 811 closer to a first housing (e.g., the first housing 201 in FIG. 1).

According to an embodiment, when the electronic device detects the slide-in motion, the electronic device may display a reduced-size home screen 831 and change the navigation bar 840 to a multi-interaction area 841 (e.g., a task bar).

According to an embodiment, the multi-interaction area 841 may include at least one application icon 843 (e.g., area B) included in the application icon area which is fixed on the home screen in the open state, an application button 842 (e.g., area C) for identifying all applications installed on the electronic device, and a navigation bar 844 (e.g., area D) in a reduced layout.

According to an embodiment, although not shown in FIG. 8B, the multi-interaction area 841 may further include an area that displays recently executed applications (e.g., a recent application icon display area).

FIG. 8C is a diagram illustrating an example icon display operation based on the closed state of an electronic device according to various embodiments.

Referring to FIG. 8C, the electronic device may display a multi-window screen in the open state. According to an embodiment, the multi-window screen may include an execution screen 850 (e.g., area A) of a first application and an execution screen 860 (e.g., area E) of a second application. According to an embodiment, the electronic device may display a navigation bar 870 (e.g., area D) in addition to the multi-window screen. According to an embodiment, the navigation bar 870 may include a button for identifying recently executed applications, a button for moving to a home screen, and a button for moving to a previous screen.

According to an embodiment, when a user input for switching from the open state to the closed state is received, the electronic device may perform a slide-in motion by moving a second housing (e.g., the second housing 202 in FIG. 2) in the second direction 811 closer to a first housing (e.g., the first housing 201 in FIG. 1).

According to an embodiment, when the electronic device detects the slide-in motion, it may reduce the size of at least one of an execution screen 851 of the first application or an execution screen 861 of the second application, and change the navigation bar 870 to a multi-interaction area 871 (e.g., task bar).

According to an embodiment, the multi-interaction area 871 may include at least one application icon 873 (e.g., area B) included in an application icon area which is fixed on a home screen in the open state, an application button 872 (e.g., area C) for identifying all applications installed on the electronic device, a navigation bar 874 (e.g., area D) in a reduced layout, and an icon 875 (e.g., area E) of an application that will not be displayed in the closed state.

According to an embodiment, when the execution screen 861 of the second application is reduced based on the slide-in motion, the icon 875 corresponding to the second application may be included in the multi-interaction area 871.

According to an embodiment, when the slide-in motion is completed, the electronic device may display an execution screen 852 of the first application and the multi-interaction area 871 based on the size of the exposed area of the flexible display in the closed state.

According to an embodiment, although not shown in FIG. 8C, the multi-interaction area 871 may further include an icon of the first application being displayed.

Figure 9:
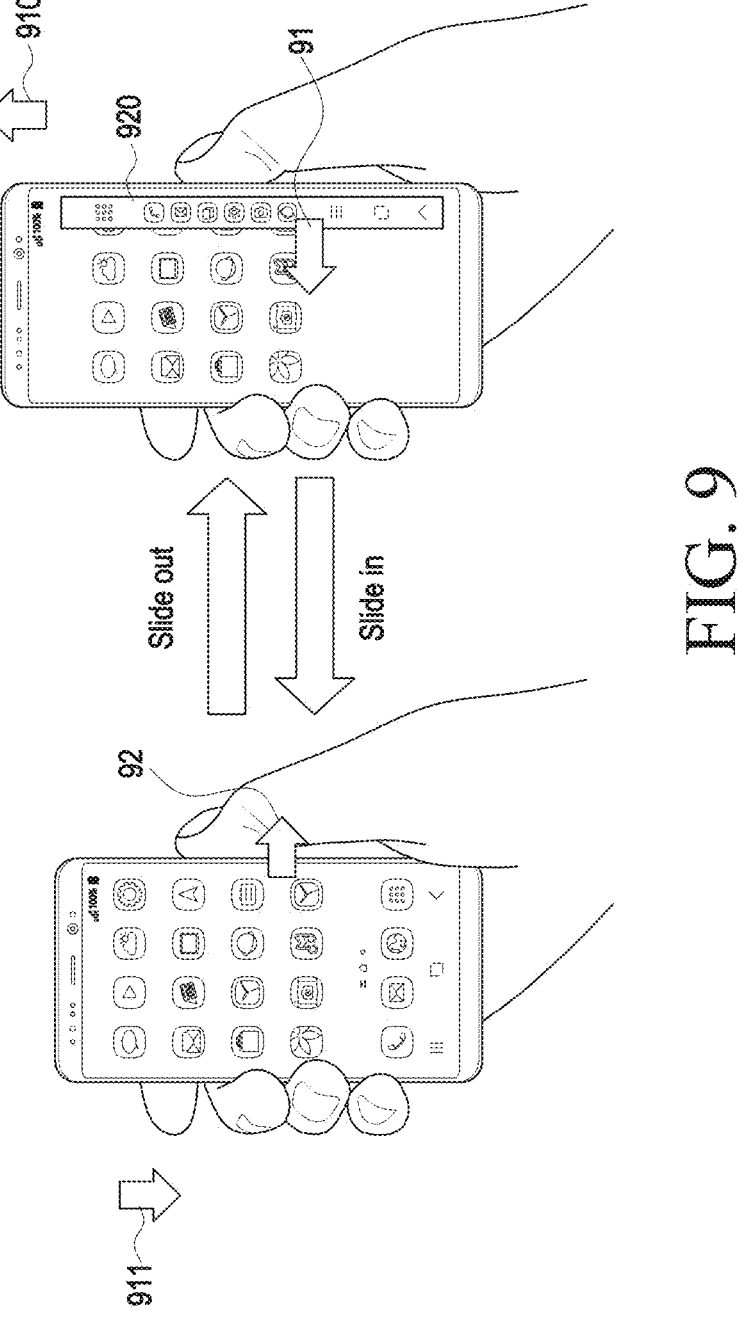
FIG. 9 is a diagram illustrating an example icon display operation based on an open state and a griped state of an electronic device according to various embodiments.

FIG. 9 is a diagram illustrating an example icon display operation based on an open state and a grip state of an electronic device according to various embodiments. For example, FIG. 9 illustrates a case where the electronic device is gripped with a right hand.

Figure 10:
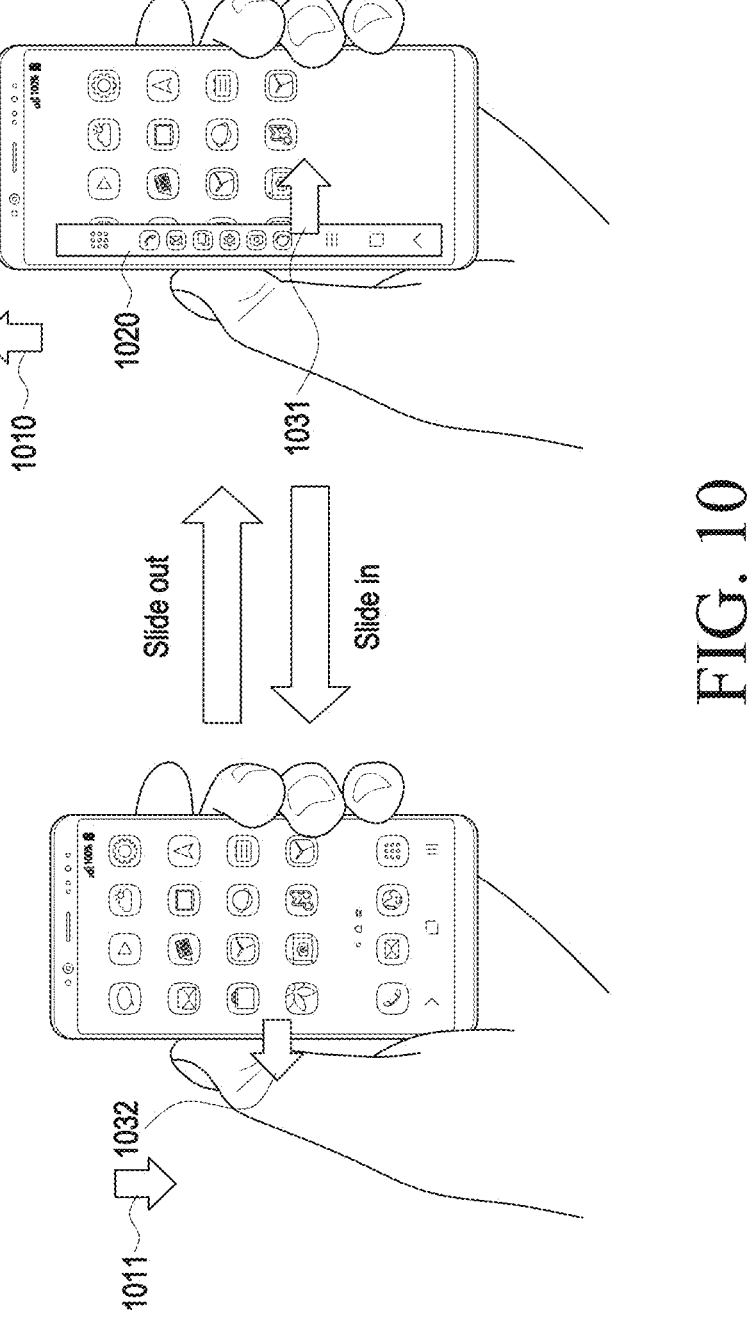
FIG. 10 is a diagram illustrating an example icon display operation based on an open state and a griped state of an electronic device according to various embodiments.

FIG. 10 is a diagram illustrating an icon display operation based on an open state and a grip state of an electronic device according to various embodiments of the disclosure. For example, FIG. 10 is a diagram illustrating an example where the electronic device is gripped with a left hand according to various embodiments.

According to an embodiment, the electronic device (e.g., the electronic device 101 in FIG. 1, an electronic device 101 of FIG. 2, or a processor 120 of FIG. 1) may display a task bar by considering not only a movement direction of a housing but also a grip state of a hand.

According to an embodiment, the electronic device may identify at least one of the type (e.g., left hand or right hand) or grip shape of a hand gripping the electronic device through a sensor. For example, a task bar may be displayed on at least one of a lower, left, and/or right side of an exposed area of a flexible display.

Referring to FIG. 9, the electronic device may display a task bar 920 on the right side of the exposed area of the flexible display, based on detecting that a slide-out motion is performed in a first direction 910 in which the second housing moves away from the first housing and that a grip direction is a grip by the right hand. According to an embodiment, the electronic device may display at least one icon 920 in a partial area of the exposed area of the flexible display, including a right edge area. For example, the electronic device may display the at least one icon 920 in a manner that moves the at least one icon 920 located outside the right edge area of the exposed area of the flexible display from the outside of the right edge area to the left.

According to an embodiment, the electronic device may display the at least one icon in the partial area of the exposed area in response to the second housing moving in a second direction 911 (e.g., a slide-in motion) and the size of the exposed area of the flexible display being equal to or greater than a set value (91). In an embodiment, the electronic device may not display the at least one icon in response to the second housing moving in the second direction 911 and the size of the exposed area of the flexible display being less than the set value. For example, the electronic device may hide the displayed at least one icon in response to the second housing moving in the second direction 911 and the size of the exposed area of the flexible display being less than the set value (92). For example, the electronic device may hide the at least one icon 920 in a manner that moves the at least one icon 920 out of the right edge of the exposed area of the flexible display (92). In an embodiment, displaying the at least one icon may include displaying the task bar 920.

Referring to FIG. 10, the electronic device may display a task bar 1020 on the left side of the exposed area of the flexible display, based on detecting that a slide-out motion is performed in a first direction 1010 in which the second housing moves away from the first housing and that the grip direction is a grip by the left hand. According to an embodiment, the electronic device may display at least one icon 1020 in a partial area of the exposed area of the flexible display, including a left edge area. For example, the electronic device may display the at least one icon 1020 in a manner that moves the at least one icon 1020 located outside the left edge area of the exposed area of the flexible display from the outside of the left edge area to the right (1031).

According to an embodiment, the electronic device may display the at least one icon in a partial area of the exposed area in response to the second housing moving in a second direction 1011 (e.g., a slide-in motion) and the size of the exposed area of the flexible display being equal to or greater than a set value. According to an embodiment, the electronic device may not display the at least one icon in response to the second housing moving in the second direction 1011 and the size of the exposed area of the flexible display being less than the set value. For example, the electronic device may hide the displayed at least one icon in response to the second housing moving in the second direction 1011 and the size of the exposed area of the flexible display being less than the set value (1032). For example, the electronic device may hide the at least one icon 1020 in a manner that moves the at least one icon 1020 out of the left edge of the exposed area of the flexible display (1032). According to an embodiment, displaying the at least one icon may include displaying the task bar 1020.

Figure 11:
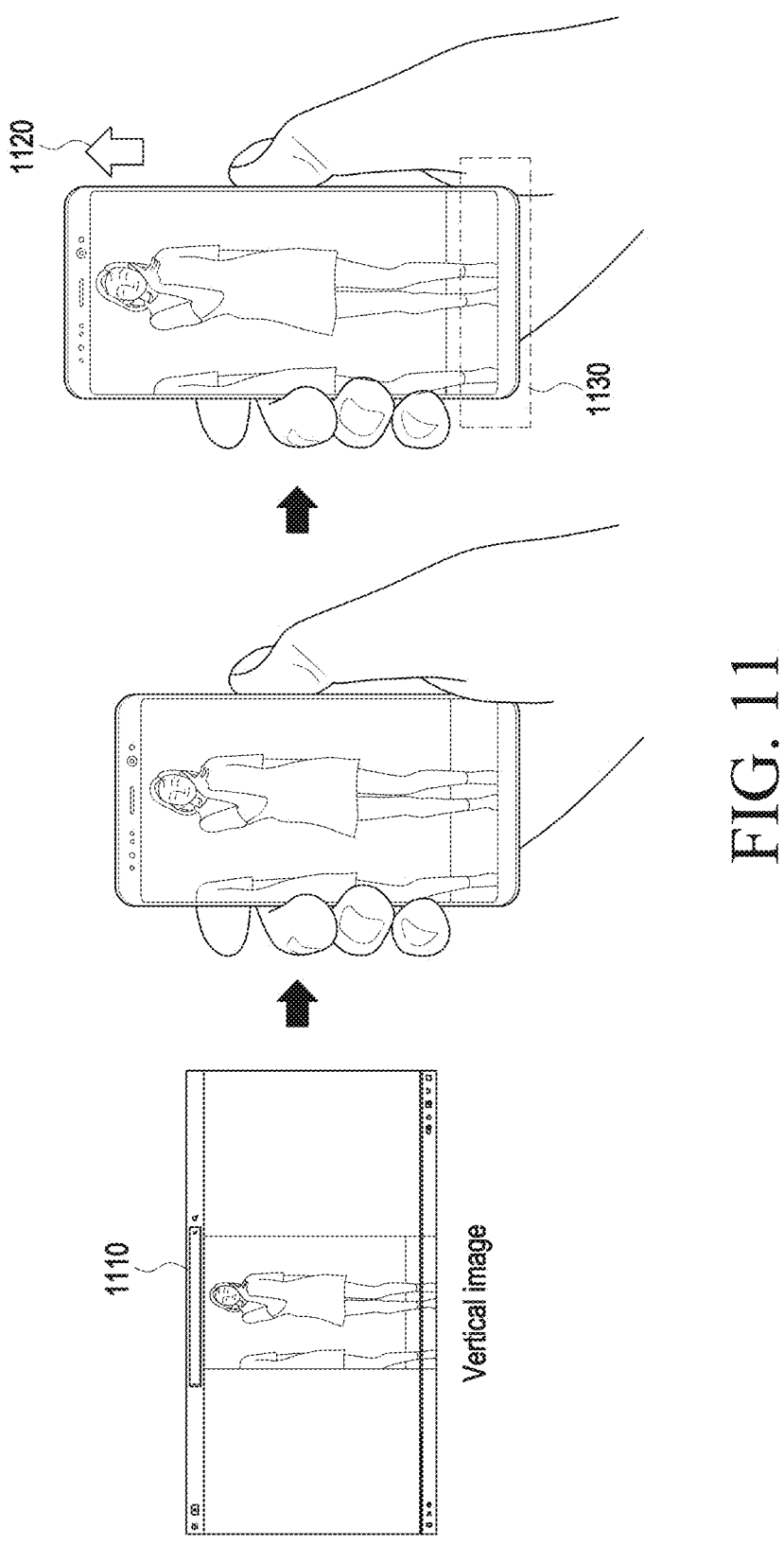
FIG. 11 is a diagram illustrating an example icon display operation based on an open state of an electronic device and content being displayed according to various embodiments.

FIG. 11 is a diagram illustrating an example icon display operation based on an open state of an electronic device and content being displayed according to various embodiments.

Figure 12:
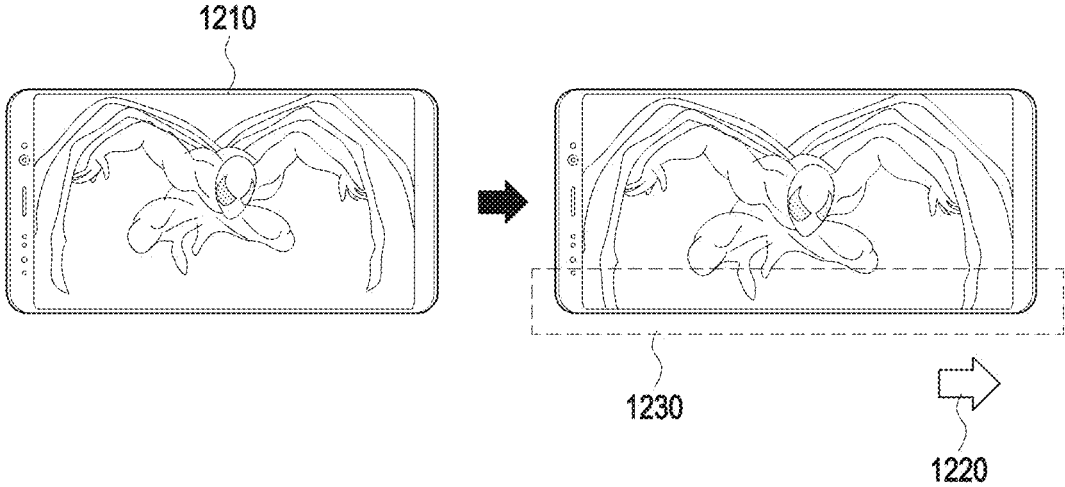
FIG. 12 is a diagram illustrating an example icon display operation based on an open state of an electronic device and content being displayed according to various embodiments.

FIG. 12 is a diagram illustrating an example icon display operation based on an open state of an electronic device and content being displayed according to various embodiments.

Figure 13:
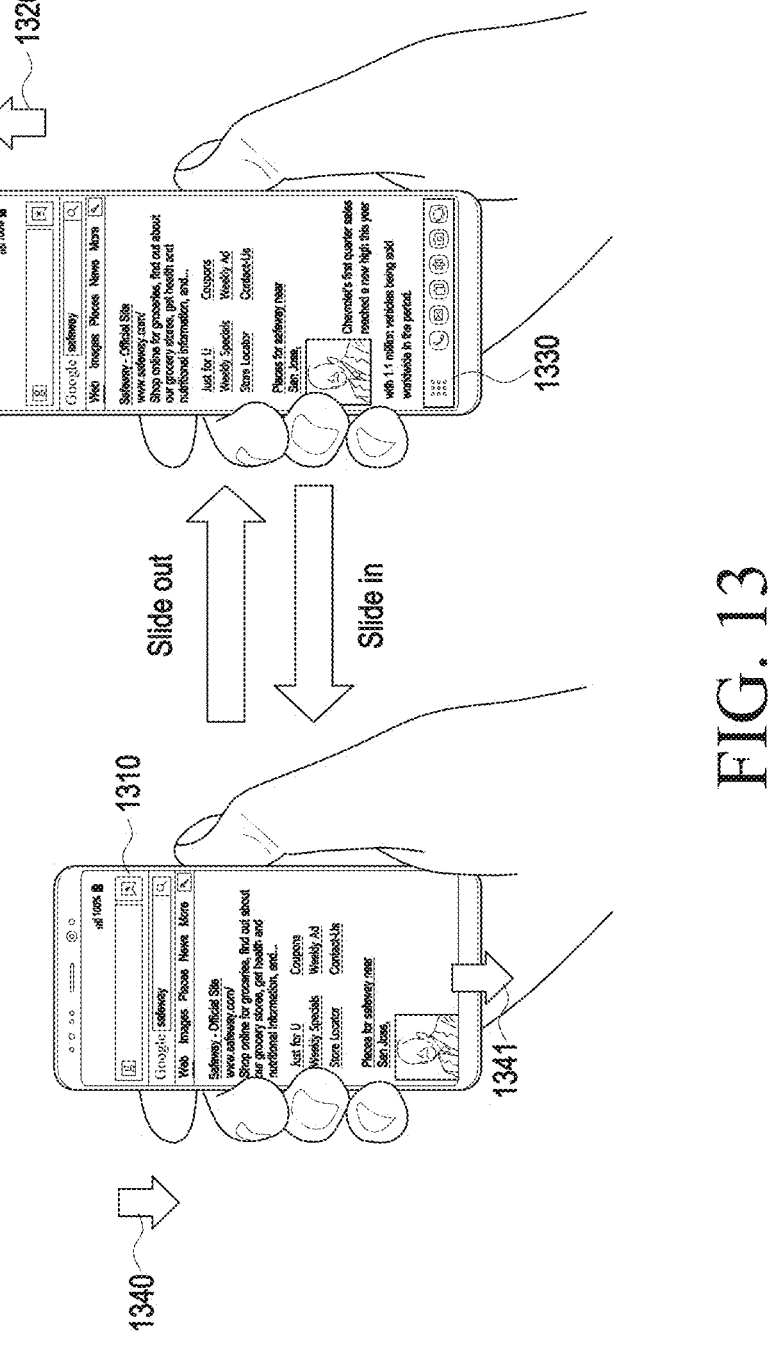
FIG. 13 is a diagram illustrating an example icon display operation based on an open state of an electronic device and content being displayed according to various embodiments.

FIG. 13 is a diagram illustrating an example icon display operation based on an open state of an electronic device and content being displayed according to various embodiments.

According to an embodiment, the electronic device (e.g., the electronic device 101 in FIG. 1, the electronic device 101 in FIG. 2, or the processor 120 in FIG. 1) may control display of a task bar based on an application for which an execution screen is being displayed, and content being displayed. For example, the electronic device may determine the order of at least one application icon included in the task bar or a related application icon based on the displayed execution screen of the application or the displayed content.

According to an embodiment, the electronic device may turn off a task bar function and set a screen brightness to dark, when using an ultra-low power mode.

According to an embodiment, the electronic device may not display at least one icon, based on the application for which the execution screen is being displayed in the exposed area of the flexible display satisfying a set condition during a slide motion (e.g., movement of the second housing).

According to an embodiment, the set condition of the application for which the execution screen is being displayed may refer, for example, to a property of the application for which the execution screen is being displayed.

According to an embodiment, the electronic device may configure a screen frame according to the size of the exposed area, whenever the y size of the exposed area of the flexible display changes. For example, the electronic device may reconfigure the screen through a rendering process for the application execution screen, based on detection of the slide motion.

According to an embodiment, the electronic device may provide a state in which all operations of a new screen are possible during the slide-in motion, such as the closed state. For example, the electronic device may reset a slide motion-related function without executing it in the closed state, which may be a state in which all functions may be performed without restrictions on a slide motion. According to an embodiment, the electronic device may provide the experience of viewing a video that fills the exposed area of the flexible display without any truncation or margin of an execution screen or content and the experience of viewing vertically scrolling content at a glance, during the slide-out motion.

According to an embodiment, the electronic device may not display the task bar even during the slide-out motion, when the screen should not be obstructed.

For example, as illustrated in FIG. 11, when content 1110 is a vertical image, the electronic device may not display a task bar in a partial area 1130 for displaying the task bar on the exposed area of the flexible display, even when a slide-out motion 1120 is performed by a user input while content is being displayed in full screen.

According to an embodiment, as illustrated in FIG. 12, when an application (e.g., a movie or a game) for which an execution screen 1210 is displayed on an entire screen (e.g., a horizontal screen or a vertical screen) is being executed, the electronic device may not display a task bar in a partial area 1230 for displaying the task bar on the exposed area of the flexible display, even if a slide-out motion 1220 is performed.

According to an embodiment, as illustrated in FIG. 13, when screen obstruction is not significant as in an application (e.g., an Internet application) other than the content or application illustrated in FIGS. 11 and 12, the electronic device may display a task bar on a screen, even when an execution screen 1310 of the application is displayed in full screen.

Referring to FIG. 13, the electronic device may display at least one icon 1330 in a partial area of the exposed area of the flexible display, based on movement (e.g., slide-out motion) of the second housing in a first direction 1320 while an execution screen of an application (e.g., Internet application) is being displayed in full screen. For example, the electronic device may display the at least one icon 1330 in a manner that moves the at least one icon 1330 outside the screen to a partial area of the exposed area. According to an embodiment, the electronic device may display the at least one icon 1330 in a partial area of the exposed area of the flexible display, including a lower edge area. According to an embodiment, the at least one icon 1330 may be displayed in a partial area of the exposed area of the flexible display, including a left edge area or a right edge area.

According to an embodiment, the electronic device may display the at least one icon in the partial area of the exposed area in response to the second housing moving in a second direction 1340 (e.g., a slide-in motion) and the size of the exposed area of the flexible display being equal to or greater than a set value. According to an embodiment, the electronic device may not display the at least one icon in response to the second housing moving in the second direction 1340 and the size of the exposed area of the flexible display being less than the set value. For example, the electronic device may hide the displayed at least one icon in response to the second housing moving in the second direction 1340 and the size of the exposed area of the flexible display being less than the set value (1341). For example, the electronic device may hide the at least one icon 1330 in a manner that moves the at least one icon 1330 out of the screen (1341). According to an embodiment, displaying the at least one icon may include displaying the task bar 1330.

FIGS. 14A, 14B, 14C, 14D, 14E 14F, 14G, 14H, 14I and 14J (which may be referred to as FIGS. 14A to 14J) are diagrams illustrating an icon display operation based on an open state and a locked state of an electronic device according to various embodiments.

Figures 14A, 14B, 14C, 14D, 14E, 14F, 14G, 14H, 14I, 14J:
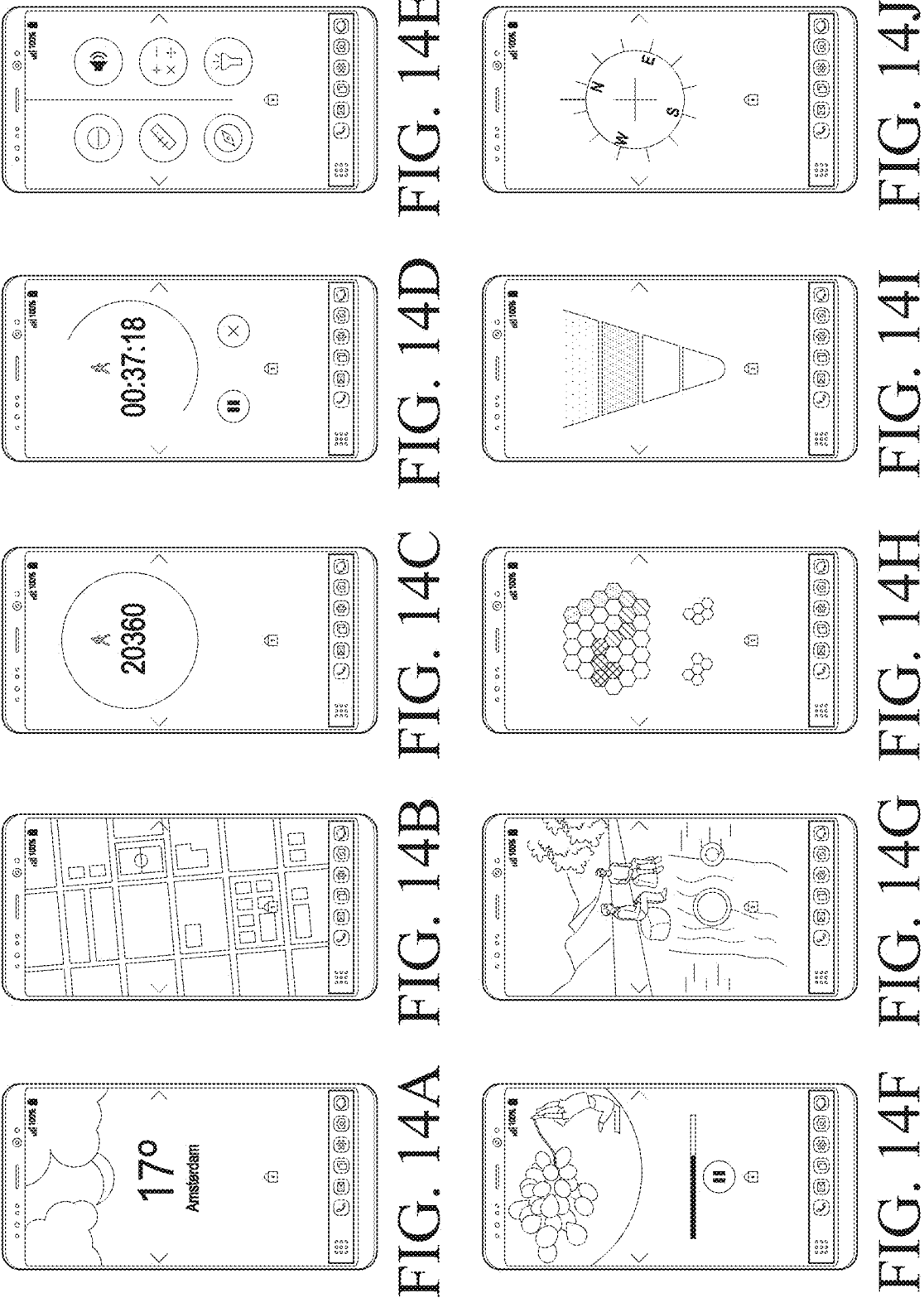
FIGS. 14A, 14B, 14C, 14D, 14E, 14F, 14G, 14H, 14I and 14J are diagrams illustrating an example icon display operation based on an open state and a locked state of an electronic device according to various embodiments.

Referring to FIGS. 14A to 14J, the electronic device (e.g., the electronic device 101 in FIG. 1, the electronic device 101 in FIG. 2, or the processor 120 in FIG. 1) may provide an essential function that allows immediate use of the electronic device taken out of a pocket without unlocking it. For example, the essential function may include a weather function as illustrated in FIG. 14A, a map function as illustrated in FIG. 14B, an exercise level check function as illustrated in FIG. 14C, a timer function as illustrated in FIG. 14D, a quick tools function as illustrated in FIG. 14E, a music play control function as illustrated in FIG. 14F, a camera function as illustrated in FIG. 14G, a simple game function as illustrated in FIG. 14H, a flashlight function as illustrated in FIG. 14I, and a compass function as illustrated in FIG. 14J.

According to an embodiment, the electronic device may arrange at least one icon included in a task bar in order in consideration of the properties of an application being displayed (e.g., the type of the application), even on a locked screen that is not unlocked or an always on display (AOD) screen. According to an embodiment, in response to a screen size being equal to or greater than a set size according to a slide motion, the electronic device may display the task bar including the at least one icon arranged in order in a partial area.

Figure 15:
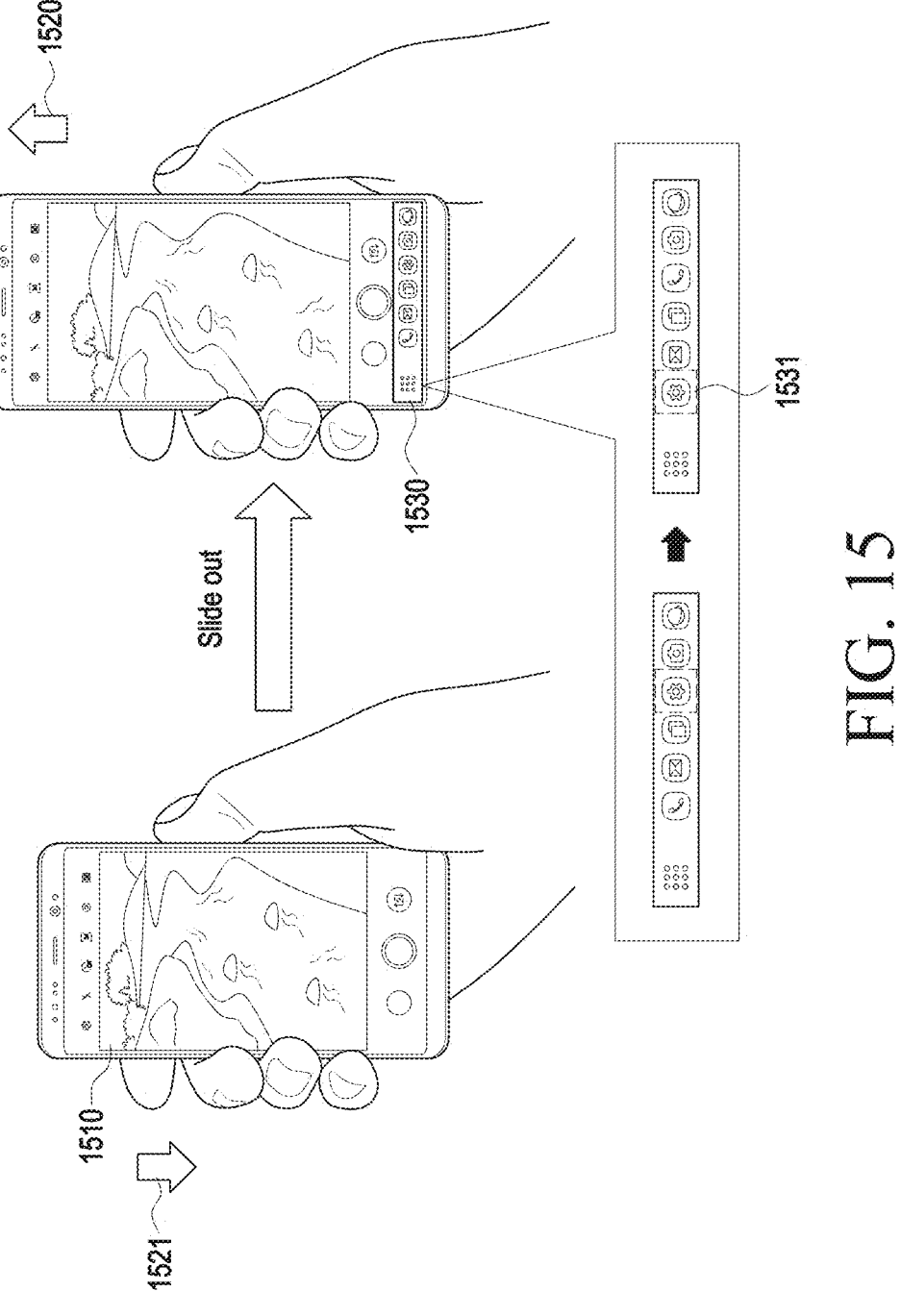
FIG. 15 is a diagram illustrating an example icon arrangement operation based on a running application in an electronic device according to various embodiments.

FIG. 15 is a diagram illustrating an example icon arrangement operation based on a running application in an electronic device according to various embodiments.

Referring to FIG. 15, the electronic device (e.g., the electronic device 101 in FIG. 1, the electronic device 101 in FIG. 2, or the processor 120 in FIG. 1) may display at least one icon 1530 in a partial area of the exposed area of the flexible display based on the second housing moving in a first direction 1520 (e.g., a slide-out motion) while an execution screen 1510 of a camera application is being displayed. For example, the electronic device may display the at least one icon 1530 in a manner that moves the at least one icon 1530 outside the screen to the partial area of the exposed area. According to an embodiment, the electronic device may display the at least one icon 1530 in a partial area of the exposed area of the flexible display, including a lower edge area. According to an embodiment, the at least one icon 1530 may be displayed in a partial area of the exposed area of the flexible display, including a left edge area or a right edge area.

According to an embodiment, the task bar may include a running application icon, a favorite application icon, and an application button for displaying all application icons, and running application icons may be arranged in an execution order of running applications for which execution screens are not being displayed. According to an embodiment, the favorite application icon may include at least one of app shortcut, deep link shortcut, contact shortcut, Internet bookmark shortcut, my files shortcut, folder, or paired app.

According to an embodiment, the electronic device may configure the task bar 1530 so that an icon 1531 of a related application is disposed first based on the running application 1510. For example, the electronic device may arrange at least one icon in order based on an execution screen 1510 of the application displayed on the exposed area of the flexible display, and display the arranged at least one icon 1530 in a partial area, when a slide motion (e.g., movement of the second housing) is performed.

For example, when the execution screen 1510 of the camera application is displayed during the slide-out motion in the first direction 1520, the electronic device may arrange and display icons so that the icon 1531 of a photo album application related to the camera application is disposed first. According to an embodiment, the electronic device may display the at least one icon in the partial area of the exposed area in response to the second housing moving in a second direction 1521 (e.g., slide-in motion) and the size of the exposed area of the flexible display being equal to or greater than a set value. According to an embodiment, the electronic device may not display the at least one icon in response to the second housing moving in the second direction 1521 and the size of the exposed area of the flexible display being less than the set value. For example, the electronic device may hide the displayed at least one icon in response to the second housing moving in the second direction 1521 and the size of the exposed area of the flexible display being less than the set value. For example, the electronic device may hide the at least one icon 1530 in a manner that moves the at least one icon 1530 out of the screen. In an embodiment, displaying the at least one icon may include displaying the task bar 1530.

In an embodiment, the electronic device may determine the size of the task bar or the number of the at least one icon included in the task bar, based on the size of the exposed area. According to an embodiment, when the size of the exposed area becomes equal to or greater than a first size by a slide-out motion, the electronic device may display the task bar so that the at least one icon is arranged in a single row. According to an embodiment, when the size of the exposed area becomes equal to or greater than a second size greater than the first size, the electronic device may display the task bar so that the at least one icon is arranged in two rows. In this way, the electronic device may display the task bar in a larger size when the size of the exposed area of the flexible display is larger. According to an embodiment, the electronic device may display a task bar including more icons when the size of the exposed area of the flexible display is the second size than when the size of the exposed area of the flexible display is the first size. According to an embodiment, the electronic device may display a task bar including at least one larger icon when the size of the exposed area of the flexible display is the second size than when the size of the exposed area of the flexible display is the first size.

According to an embodiment, when the at least one icon is arranged in two rows based on the size of the exposed area being equal to or greater than the second size, the electronic device may change the at least one icon to one row or cause it to disappear, when a set time elapses after completion of the slide-out motion.

According to an embodiment, when receiving a user input for selecting one of the at least one icon displayed in the partial area of the exposed area of the flexible display, the electronic device may display an execution screen of an application corresponding to the selected icon in the exposed area. For example, when an icon is selected from the task bar while the execution screen of the application is displayed, the electronic device may replace the execution screen of the application with an execution screen of an application corresponding to the selected icon.

According to an example embodiment, an electronic device may include: a first housing, a second housing disposed to be movable relative to the first housing and overlapping at least a portion of the first housing, a flexible display at least partially mounted on a surface of the second housing, at least partially visible to an outside of the electronic device, and at least partially extendable from an inside of the first housing based on movement of the second housing relative to the first housing in a first direction or inserted into the first housing based on movement of the second housing relative to the first housing in a second direction, a driving module comprising a gear disposed inside the first housing or the second housing and configured to move the second housing in the first direction or the second direction based on operation of a driving source, at least one processor, comprising processing circuitry, and at least one memory operably connected to at least one processor. At least one processor, individually and/or collectively, may be configured to: receive an input for moving the second housing, and in response to the movement of the second housing in the first direction based on the input or a size of a visible area of the flexible display visible based on the movement of the second housing being equal to or greater than a set value, display at least one icon corresponding respectively to at least one running application in a partial area of the visible area.

According to an example embodiment, the first direction and the second direction may be parallel to a direction of a longer length of horizontal and vertical lengths of the electronic device.

According to an example embodiment, at least one processor, individually and/or collectively, may be configured to control the display to: display the at least one icon in the partial area of the visible area in response to the movement of the second housing in the first direction, display the at least one icon in the partial area of the visible area in response to the movement of the second housing in the second direction and the size of the visible area being equal to or greater than the set value, and not display the at least one icon in response to the movement of the second housing in the second direction and the size of the exposed area being less than the set value.

According to an example embodiment, at least one processor, individually and/or collectively, may be configured to control the display to not display the at least one icon based on an execution screen of an application displayed in the visible area of the flexible display satisfying a set condition, based on the second housing moving.

According to an embodiment, the electronic device may further include a sensor, and at least one processor, individually and/or collectively, may be configured to identify which hand grips the electronic device through the sensor, and identify a position of the partial area where the at least one icon is to be displayed based on the which hand is gripping the electronic device.

According to an example embodiment, at least one processor, individually and/or collectively, may be configured to: arrange the at least one icon in order based on an execution screen of an application displayed in the visible area of the flexible display, based on the second housing moving, and control the display to display the arranged at least one icon on the partial area of the visible area.

According to an example embodiment, at least one processor, individually and/or collectively, may be configured to determine at least one of a number of the at least one icon or a size of the partial area where the at least one icon is to be displayed, based on a size of the visible area based on the movement of the second housing.

According to an example embodiment, at least one processor, individually and/or collectively, may be configured to control the display to display an execution screen of an application in an area other than the partial area of the visible area.

According to an example embodiment, at least one processor, individually and/or collectively, may be configured to control the display to display the at least one icon by overlaying the at least one icon on an execution screen of an application displayed in the visible area.

According to an example embodiment, at least one processor, individually and/or collectively, may be configured to delete the at least one icon, based on a set time elapsing after displaying the at least one icon.

According to an example embodiment, at least one processor, individually and/or collectively, may be configured to, based on an input for selecting one of the at least one icon being received, control the display to display an execution screen of an application corresponding to the selected icon in the visible area.

According to an example embodiment, at least one processor, individually and/or collectively, may be configured to further control the display to display at least one of an icon for displaying icons of all applications installed on the electronic device or at least one icon set by an input in the partial area of the visible area.

According to an example embodiment, at least one processor, individually and/or collectively, may be configured to control the display to display at least one icon corresponding respectively to at least one running application in a partial area of a visible area of the flexible display.

According to an example embodiment, at least one processor, individually and/or collectively, may be configured to receive an input for moving the second housing.

According to an example embodiment, at least one processor, individually and/or collectively, may be configured to, in response to the movement of the second housing in the second direction based on the input or a size of the visible area of the flexible display visible based on the movement of the second housing being less than a set value, reduce an area where the at least one icon is displayed in the partial area, and further control the display to display, in a remaining area of the partial area, at least one icon corresponding respectively to at least one application displayed in an area other than the partial area and/or an icon for displaying icons of all applications installed on the electronic device.

According to an example embodiment, a method for controlling an electronic device may include: receiving an input for moving a second housing disposed to be movable relative to a first housing of the electronic device, and in response to a size of a visible area of a flexible display being equal to or greater than a set value or movement of the second housing in a first direction based on the input, displaying at least one icon corresponding respectively to at least one running application in a partial area of the visible area of the flexible display, the flexible display being at least partially mounted on a surface of the second housing, at least partially visible to an outside of the electronic device, and at least partially extended from an inside of the first housing based on the movement of the second housing relative to the first housing in the first direction or inserted into the first housing based on movement of the second housing relative to the first housing in a second direction.

According to an example embodiment, the first direction and the second direction may be parallel to a direction of a longer length of horizontal and vertical lengths of the electronic device.

According to an example embodiment, displaying may include: displaying the at least one icon in the partial area of the visible area, in response to the movement of the second housing in the first direction, displaying the at least one icon in the partial area of the visible area, in response to the movement of the second housing in the second direction and the size of the visible area being equal to or greater than the set value, and not displaying the at least one icon, in response to the movement of the second housing in the second direction and the size of the visible area being less than the set value.

According to an example embodiment, displaying may include not displaying the at least one icon based on an execution screen of an application displayed in the visible area of the flexible display satisfying a set condition, based on the second housing moving.

According to an example embodiment, the method may further include identifying which hand grips the electronic device through a sensor, and identifying a position of the partial area where the at least one icon is to be displayed based on which hand is gripping the electronic device.

According to an example embodiment, the method may further include arranging the at least one icon in order based on an execution screen of an application displayed in the visible area of the flexible display, based on the second housing moving, and displaying may include displaying the arranged at least one icon on the partial area of the visible area.

According to an example embodiment, the method may further include determining at least one of a number of the at least one icon or a size of the partial area where the at least one icon is to be displayed, based on a size of the visible area based on the movement of the second housing.

According to an example embodiment, the method may further include, based on an input for selecting one of the at least one icon being received, displaying an execution screen of an application corresponding to the selected icon in the visible area.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1$^{st}$" and "2$^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
 a first housing;
 a second housing disposed to be movable relative to the first housing and overlapping at least a portion of the first housing;
 a flexible display at least partially mounted on a surface of the second housing, at least partially visible to an outside of the electronic device, and at least partially extendable from an inside of the first housing based on movement of the second housing relative to the first housing in a first direction or insertable into the first housing based on movement of the second housing relative to the first housing in a second direction;
 a driving module comprising a gear disposed inside the first housing or the second housing, the gear engaging the second housing to move the second housing in the first direction or the second direction based on operation of a driving source;
 at least one processor comprising processing circuitry; and
 memory storing instructions that, when executed by the at least one processor individually or collectively, cause the electronic device to:
 receive an input for moving the second housing,
 based on the input, control the driving module to move the second housing in the first direction or the second direction,
 detect movement of the second housing via a signal generated by the driving module or a first sensor configured to sense movement of the second housing,
 in response to (i) the detected movement of the second housing in the first direction or (ii) a size of a visible area of the flexible display being equal to or greater than a set value based on the detected movement of the second housing, display a task bar including at least one icon corresponding respectively to at least one running application installed on the electronic device in a partial area of the visible area from a state in which the task bar was not displayed in the visible area, and
 control the flexible display to update the display of the task bar based on the detected movement of the second housing.

2. The electronic device of claim 1, wherein the first direction and the second direction are parallel to a direction of a longer length of horizontal and vertical lengths of the electronic device.

3. The electronic device of claim 1, wherein the instructions, when executed by the at least one processor individually and/or collectively, cause the electronic device to:
 in response to the detected movement of the second housing in the first direction, display the at least one icon in the partial area of the visible area,
 in response to the detected movement of the second housing in the second direction and the size of the visible area being equal to or greater than the set value, display the at least one icon in the partial area of the visible area, and
 in response to the detected movement of the second housing in the second direction and the size of the visible area being less than the set value, not display the at least one icon,
 wherein the at least one processor updates the display of the at least one icon in accordance with changes in the detected movement of the second housing.

4. The electronic device of claim 1, wherein the instructions, when executed by the at least one processor individually and/or collectively, cause the electronic device to, based on an execution screen of an application installed on the electronic device displayed in the visible area of the flexible display satisfying a set condition, based on the second housing moving, control the flexible display to not display the at least one icon.

5. The electronic device of claim 1, further comprising a second sensor, wherein the instructions, when executed by the at least one processor individually and/or collectively, cause the electronic device to:

identify which hand grips the electronic device through the second sensor, and based on which hand grips the electronic device, identify a position of the partial area of the visible area where the at least one icon is to be displayed.

6. The electronic device of claim 1, wherein the instructions, when executed by the at least one processor individually and/or collectively, cause the electronic device to:

based on an execution screen of an application installed on the electronic device displayed in the visible area of the flexible display, based on the second housing moving, arrange the at least one icon in order, and control the flexible display to display the arranged at least one icon on the partial area of the visible area.

7. The electronic device of claim 1, wherein the instructions, when executed by the at least one processor individually and/or collectively, cause the electronic device to, based on the size of the visible area based on the detected movement of the second housing, determine at least one of a number of the at least one icon or a size of the partial area of the visible area where the at least one icon is to be displayed.

8. The electronic device of claim 1, wherein the instructions, when executed by the at least one processor individually and/or collectively, cause the electronic device to display an execution screen of an application installed on the electronic device in an area other than the partial area of the visible area.

9. The electronic device of claim 1, wherein the instructions, when executed by the at least one processor individually and/or collectively, cause the electronic device to display the at least one icon by overlaying the at least one icon on an execution screen of an application installed on the electronic device displayed in the visible area.

10. The electronic device of claim 9, wherein the instructions, when executed by the at least one processor individually and/or collectively, cause the electronic device to, based on a set time elapsing after displaying the at least one icon, delete the at least one icon.

11. The electronic device of claim 1, wherein the instructions, when executed by the at least one processor individually and/or collectively, cause the electronic device to, based on an input for selecting one of the at least one icon being received, control the flexible display to display an execution screen of an application installed on the electronic device corresponding to the selected icon in the visible area.

12. An electronic device comprising:

a first housing;

a second housing disposed to be movable relative to the first housing and overlapping at least a portion of the first housing;

a flexible display at least partially mounted on a surface of the second housing, at least partially visible to an outside of the electronic device, and at least partially extendable from an inside of the first housing based on movement of the second housing relative to the first housing in a first direction or insertable into the first housing based on movement of the second housing relative to the first housing in a second direction;

a driving module comprising a gear disposed inside the first housing or the second housing, the gear engaging the second housing to move the second housing in the first direction or the second direction based on operation of a driving source;

at least one processor comprising processing circuitry; and memory storing instructions that, when executed by the at least one processor individually or collectively, cause the electronic device to:

control the flexible display to display a navigation bar including a button for identifying recently executed applications installed on the electronic device, a button for moving to a home screen, or a button for moving to a previous screen in a partial area of a visible area of the flexible display;

receive an input for moving the second housing, based on the input, control the driving module to move the second housing in the first direction or the second direction, detect movement of the second housing via a signal generated by the driving module or by a sensor configured to sense movement of the second housing, in response to (i) the detected movement of the second housing in the second direction or (ii) a size of the visible area of the flexible display being less than a set value based on the detected movement of the second housing, reduce an area where the navigation bar is displayed in the partial area of the visible area, and display, in a remaining area of the partial area of the visible area resulting from the reduction of the area where the navigation bar is displayed, a task bar including at least one icon corresponding respectively to at least one running application installed on the electronic device the at least one icon corresponding respectively to at least one application installed on the electronic device displayed in an area other than the partial area of the visible area or an icon for displaying icons of all applications installed on the electronic device, and control the flexible display to update the display of the navigation bar, the task bar, and the at least one icon corresponding respectively to the at least one application displayed in the area or the icon for displaying icons of the all applications based on the detected movement of the second housing.

13. A method for controlling an electronic device, comprising:

receiving an input for moving a second housing disposed to be movable relative to a first housing of the electronic device;

based on the input, controlling a driving module to move the second housing in a first direction or a second direction, wherein the driving module comprises a gear disposed inside the first housing or the second housing, the gear engaging the second housing to move the second housing in the first direction or the second direction based on operation of a driving source;

detecting movement of the second housing via a signal generated by the driving module or by a first sensor configured to sense movement of the second housing; and in response to (i) the detected movement of the second housing in the first direction or (ii) a size of a visible area of a flexible display being equal to or greater than a set value based on the detected movement of the second housing, displaying a task bar including at least one icon corresponding respectively to at least one running application installed on the electronic device in a partial area of the visible area of the flexible display from a state in which the task bar was not displayed in the visible area, and controlling the flexible display to update the display of the task bar based on the detected movement of the second housing, wherein the flexible display is at least partially mounted on a surface of the second housing, at least partially visible to an outside of the electronic device, and at least partially extended from an inside of the first housing based on movement of the second housing relative to the first housing in the first direction or inserted into the first housing based on movement of the second housing relative to the first housing in the second direction.

14. The method of claim 13, wherein the first direction and the second direction are parallel to a direction of a longer length of horizontal and vertical lengths of the electronic device.

15. The method of claim 13, wherein displaying comprises:

in response to the detected movement of the second housing in the first direction, displaying the at least one icon in the partial area of the visible area, in response to the detected movement of the second housing in the second direction and the size of the visible area being equal to or greater than the set value, displaying the at least one icon in the partial area of the visible area, and in response to the detected movement of the second housing in the second direction and the size of the visible area being less than the set value, not displaying the at least one icon.

16. The method of claim 13, further comprising:

based on an execution screen of an application installed on the electronic device displayed in the visible area of the flexible display satisfying a set condition, based on the second housing moving, not displaying the at least one icon.

17. The method of claim 13, further comprising:

identifying which hand grips the electronic device through a second sensor of the electronic device, and based on which hand grips the electronic device, identifying a position of the partial area of the visible area where the at least one icon is to be displayed.

18. The method of claim 13, further comprising:

based on an execution screen of an application installed on the electronic device displayed in the visible area of the flexible display, based on the second housing moving, arranging the at least one icon in order, and wherein the displaying the at least one icon corresponding respectively to the at least one running application in the partial area of the visible area of the flexible display comprises displaying the arranged at least one icon on the partial area of the visible area.

19. The method of claim 13, further comprising:

based on the size of the visible area based on the detected movement of the second housing, determining at least one of a number of the at least one icon or a size of the partial area of the visible area where the at least one icon is to be displayed.

20. A non-transitory storage medium storing instructions that, when executed by at least one processor of an electronic device individually or collectively, cause the electronic device to perform a plurality of operations, the plurality of operations comprising:

receiving an input for moving a second housing disposed to be movable relative to a first housing of the electronic device;

based on the input, controlling a driving module to move the second housing in a first direction or a second direction, wherein the driving module comprises a gear disposed inside the first housing or the second housing, the gear engaging the second housing to move the second housing in the first direction of the second direction based on operation of a driving source;

detecting movement of the second housing via a signal generated by the driving module or by a first sensor configured to sense movement of the second housing; and in response to (i) the detected movement of the second housing in the first direction or (ii) a size of a visible area of a flexible display of the second housing being equal to or greater than a set value based on the detected movement of the second housing, displaying a task bar including at least one icon corresponding respectively to at least one running application installed on the electronic device in a partial area of the visible area of the flexible display from a state in which the task bar was not displayed in the visible area, controlling the flexible display to update the display of the task bar based on the detected movement of the second housing, wherein the flexible display is at least partially mounted on a surface of the second housing, at least partially visible to an outside of the electronic device, and at least partially extended from an inside of the first housing based on the movement of the second housing relative to the first housing in the first direction or inserted into the first housing based on movement of the second housing relative to the first housing in the second direction.

* * * * *